(12) United States Patent
Doyle

(10) Patent No.: US 10,706,356 B1
(45) Date of Patent: Jul. 7, 2020

(54) SYSTEM AND METHOD FOR UNDERSTANDING HUMAN LEVEL MEANING USING A 9-DIMENSIONAL HYPERCUBE OF COGNITIVE FRAMES

(71) Applicant: William P Doyle, St. Petersburg, FL (US)

(72) Inventor: William P Doyle, St. Petersburg, FL (US)

( * ) Notice: Subject to any disclaimer, the term of this patent is extended or adjusted under 35 U.S.C. 154(b) by 0 days.

(21) Appl. No.: 16/434,491

(22) Filed: Jun. 7, 2019

(51) Int. Cl.
*G06N 3/08* (2006.01)
*G06F 16/25* (2019.01)
*G06F 16/22* (2019.01)

(52) U.S. Cl.
CPC ............ *G06N 3/08* (2013.01); *G06F 16/2264* (2019.01); *G06F 16/254* (2019.01)

(58) Field of Classification Search
None
See application file for complete search history.

(56) References Cited

U.S. PATENT DOCUMENTS

| | | | | |
|---|---|---|---|---|
| 2010/0114899 A1* | 5/2010 | Guha | ................. | G06F 16/9535 707/741 |
| 2019/0188605 A1* | 6/2019 | Zavesky | ................. | G06N 20/00 |
| 2019/0236464 A1* | 8/2019 | Feinson | ................. | G06F 17/27 |

OTHER PUBLICATIONS

Ruppenhofer, Josef, et al. "FrameNet II: Extended theory and practice." (2006). (Year: 2006).*
FitzGerald, Nicholas, et al. "Semantic role labeling with neural network factors." Proceedings of the 2015 Conference on Empirical Methods in Natural Language Processing. 2015. (Year: 2015).*

* cited by examiner

*Primary Examiner* — Li B. Zhen
*Assistant Examiner* — Markus A. Vasquez
(74) *Attorney, Agent, or Firm* — Bechen PLLC; Timothy J. Bechen

(57) ABSTRACT

The present invention provides for a computerized method for generation an action instruction based on cognitive learning. The present method and apparatus provides for accessing at least one neural network having a data set stored therein. The present method and apparatus determines at least one meaning data map of the data set. The meaning data map includes a plurality of cognitive frames that are embedded within a nine dimensional hypercube. For example, one embodiment may include a four frames making up a four dimensional cognitive dimension grammar that is embedded within the nine dimensional hypercube. The method and apparatus calculates a data meaning based on the at least one meaning data map. From this data meaning, the method and system then generates an action instruction.

10 Claims, 21 Drawing Sheets

FIG. 4
10
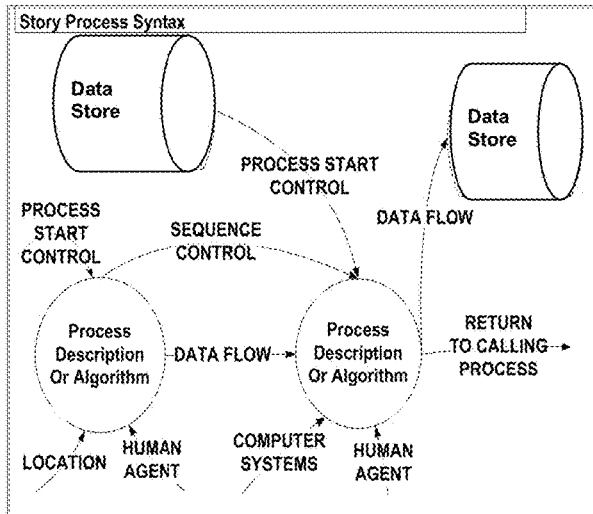
11
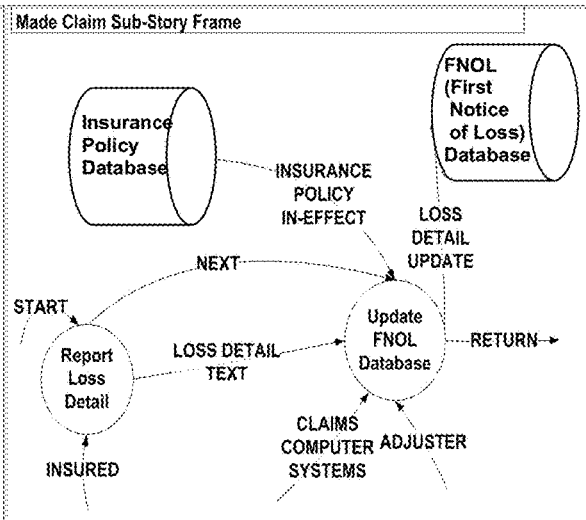
12
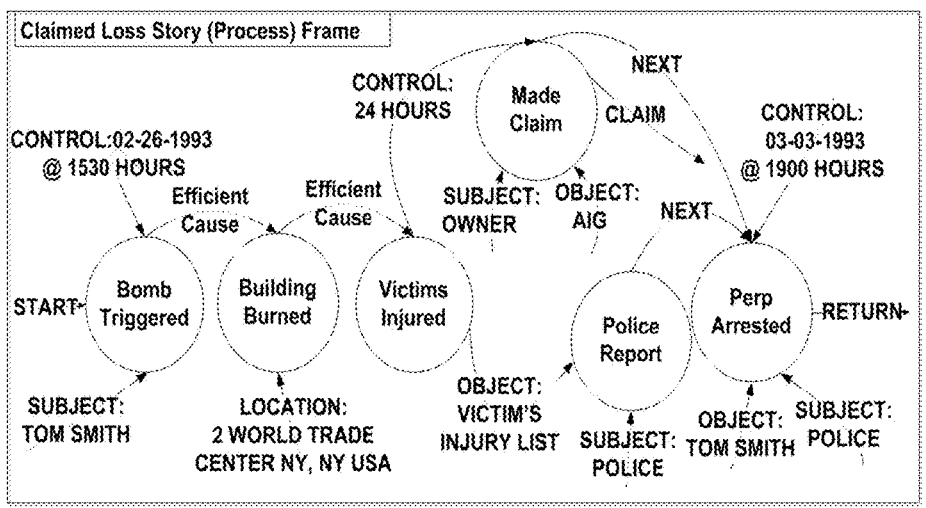
13
Tom Smith triggered a bomb at 2 World Trade Center in New York on 02-26-1993 at 1530 hours. The building burned. Many people were injured. On 03-01-1993 the owners filed a loss claim with AIG their insurance company. The police reported that they had arrested the alleged perpetrator Tom Smith on Wednesday at 1900 hours.

FIG. 6

WORDNET Part-of-Speech    Definition    Example-Sentence

S1: (n) party, (political party is an organization to gain political power)    "*in 1992 Perot tried to organize a third party at the national level*"

S2: (n) party (party is a group of people gathered together for pleasure)    "*she joined the party after dinner*"

S3: (n) party, (party is a band of people associated temporarily in some activity)    "*they organized a party to search for food*"

S4: (n) party (party is an occasion on which people assemble for social interaction entertainment)    "*he planned a party to celebrate Bastille Day*"

S5: (n) party (party is a person in a legal event)    "*the party bombed the World Trade Center*"

S6: (n) party (party is an organization in a legal event)    "*the party sent agents to investigate the bombing*"

FIG. 8

31 Learn Fact Data–Word-Concept Meanings - Sub-Steps
<u>Information Learned About Facts in this Step:</u>
Word Disambiguation + Concept Properties + Verb SVO/ SV Arguments + new instance added to Machine Learning Training Set 32 Classify Words in Fact Data using machine learning. If named-entities, Then replace in Fact Data with owning genus concept 33 If Manifestation ids encountered (where manifestation ids are database table key values created to identify database tables), Then replace with manifestation's referenced concept.

34 If endophoric reference encountered, Then defer processing sentence or structured data table until all non-endophoric sentences or structured data tables are resolved.

35 Retrieve each input-sentence-word's meanings from classification (except replaced named entities) from 4D-CMG Concept Frames. Store in all-meanings-word-concept-set. If input-sentence-word not found, Then exit to Step 901-5 Learn Frame Meaning - Word-Concept.

36 Using the input-sentence-verb's SVO/ SV property tuples from the verb's Concept Frame, classify (using machine learning) words (concept) sense in the all-meanings-word-concept-set as members of the verb's SVO/ SV concept property tuples. If no input-sentence-verb (because structured data), then infer verb based on identifying (using machine learning) co-occurrence of input-sentence-words and add verb concept(s) to input-sentence-words. Return to STEP 901-1-3.

37 Exclude concept meanings from all-meanings-concept-set that are not SVO/ SV mapped. If > 1 meaning per word in remaining all-meanings-concept-set, Then resolve in other sentences in the balance of document.

38 Resolve endophoric reference between sentences replacing reference with concepts or named-entities referenced in proximate sentences within the paragraph or document and Return to STEP 901-1-1 until all Word-Concepts in all Sentence in the document are mapped.

39 Add manifestation to machine learning training set and rain.

FIG. 9

40 Learn Fact Data -Sentence Meanings- Sub-Steps

<u>Information Learned About Facts in this Step:</u>
Sentential Phrases + Phrase Order in Sentence + Phrase Head Word + Phrase SVO/ SV Assignments + Phrase Story Assignments + Phrase Dependency Grammar + Word-Concept-Mapping + Word Order in Phrase + Endophoric Resolution Reference + new manifestations added to Machine Learning Training Sets 41 Classify (parse using machine learning) sentence sentential phrase structure, grammatical function and phrase order. If input-sentence not found, Then exit to Step 901-6 Learn Frame Meaning - Sentence.

42 Classify sentential phrase dependency grammar (using machine learning). If input-sentence-sentential-phrase not found, Then exit to Step 901-6 Learn Frame Meaning - Sentence.

43 Resolve endophoric reference between sentences replacing reference with concepts or named-entities referenced in proximate sentences within the paragraph or document and Return to STEP 901-2-1 until all Sentences in the document are mapped.

44 Add manifestation to machine learning training set and train.

45 Learn Fact Data - Story Meanings --Sub-Steps

<u>Information Learned About Facts in this Step:</u>
Sentence Order in Story + Inter-sentence Dataflow Connections + Inter-sentence Control Flow Connections + new instance added to Machine Learning Training Set 46 Classify (parse using machine learning) Story sentences. If input-sentence not found, Then exit to Step 901-7 Learn Frame Meaning - Story 47 Map Sentential Frame grammatical function in Sentence to Petri-Net Function (Story Function) using population control table 48 Assign Story Frame Source and Target data flow connections between sentences based on sentence sequence and same concept in paragraph or document.

49 Assign Story Flow of control connections between sentences that are explicitly determined in the text with conditional phrases like "If x Then y".

50 Add manifestation to machine learning training set and rain.

FIG. 10

51 Learn Frame Meanings – Word-Concept - Sub-Steps
<u>Information Learned About Frames in this Step:</u>
Word Disambiguation + Concept Properties + Verb SVO/ SV Arguments + Part of Speech + Synonyms + Machine Learning Training 52 If endophoric reference encountered, Then defer processing word lexical string until all non-endophoric sentences or structured data tables are resolved in the document. Exit to calling method.

53 If word lexical string is a code like a zip code or a manifestation id like a key value for a data table or a named entity like "USS enterprise", Then perform supervised training to add concept properties, build machine learning training sets and machine learning training to the new Word-Concept. Run ontology calculator to build ontology relationships based on properties. Exit to calling method.

54 Else Word lexical string is a word in a language. Search balance of the document for concept properties and add to concept frame. Search curated dictionaries for concept properties and add to concept frame.

55 Recursively descend all concept frame properties until measurable properties are found.

56 Train machine learning to classify measurable properties. Train Bayesian machine learning to compose measurable properties into complex property classification (properties with >1 measurable property). Train Bayesian machine learning to compose concept frame complex properties into concept classification.

57 Search curated dictionaries for synonyms and add to synonym list for concept frame Where concept properties = concept synonym properties 58 Create training set and Train machine learning.

59 Store concept information learned in 4-D CMG. Exit to calling method

FIG. 11

60 Learn Frame Meanings -Sentence Meanings-Sub-Steps

<u>Information Learned About Frames in this Step:</u>
Sentential Phrases + Phrase Order in Sentence + Phrase Head Word + Phrase SVO/ SV Assignments + Phrase Story Assignments + Phrase Dependency Grammar + Word-Concept-Mapping + Word Order in Phrase + Endophoric Resolution Reference + new instances added to Machine Learning Training Sets 61 Resolve endophoric reference between sentences replacing reference with word-concepts or named-entities referenced in proximate sentences within the paragraph or document and Return to Calling method until all Sentences in the document are resolved.

62 Classify (parse using machine learning) sentence sentential phrase structure, grammatical function and phrase order. If input-sentential-phrase not found, Then continue to next step.

63 Build remaining sentence sentential phrases from remaining words using dependency grammar from 4D-CMG for each phrase head word and modifiers: VP, NP, PP.

64 For VP identify SVO or SV argument phrases

65 Add new phrase dependency grammar to 4D-CMG

66 Create training set and Train machine learning

FIG. 12

67 Learn Frame Meanings - Story Meanings
--Sub-Steps

<u>Information Learned About Frames in this Step:</u>
Sentence Order in Story + Inter-sentence Dataflow Connections + Inter-sentence Control Flow Connections + new instance added to Machine Learning Training Set 68 Map Sentential Frame grammatical function in Sentence to Petri-Net Function (Story Function) using population control table 69 Assign Story Frame Source and Target data flow connections between sentences based on sentence sequence and same concept in paragraph or document.

70 Assign Story Flow of control connections between sentences that are explicitly determined in the text with conditional phrases like "If x Then y".

71 Create training set and Train machine learning

FIG. 16

Metaphysics Concept Hierarchy

| | |
|---|---|
| CF-CANONICAL-LEXEME | Artifact |
| CF-GENUS-CONCEPT | Artifact |
| CF-SPECIES-CONCEPT | Vehicle |
| CF-SPACE-TIME-LOC | STL |

| | |
|---|---|
| CF-CANONICAL-LEXEME | Truck |
| CF-GENUS-CONCEPT | Vehicle |
| CF-SPECIES-CONCEPT | Truck |
| CF-SPACE-TIME-LOC | STL |

| | |
|---|---|
| CF-CANONICAL-LEXEME | Ford Truck |
| CF-GENUS-CONCEPT | Truck |
| CF-SPECIES-CONCEPT | F-150 |
| CF-SPACE-TIME-LOC | STL |

| | |
|---|---|
| CF-CANONICAL-LEXEME | Ali's Truck |
| CF-GENUS-CONCEPT | F-150 |
| CF-SPECIES-CONCEPT | NER |
| CF-SPACE-TIME-LOC | STL |

Physics Concept Properties

| | |
|---|---|
| OWNING CF-CANONICAL-LEXEME | Ali's Truck |
| OWNING CF-GENUS-CONCEPT | F-150 |
| OWNING CF-SPECIES-CONCEPT | NER |
| OWNING CF-SPACE-TIME-LOCATION | STL |

| | |
|---|---|
| CONSTITUENT CF-CANONICAL-LEXEME | Ali's Truck Engine |
| CONSTITUENT CF-GENUS-CONCEPT 5l | V8 Engine |
| CONSTITUENT CF-SPECIES-CONCEPT | NER |
| CONSTITUENT CF-SPACE-TIME-LOC | STL |

| | |
|---|---|
| CONSTITUENT CF-CANONICAL-LEXEME | Ali's Truck Owner |
| CONSTITUENT CF-GENUS-CONCEPT | Legal Person Name |
| CONSTITUENT CF-SPECIES-CONCEPT | NER |
| CONSTITUENT CF-SPACE-TIME-LOC | STL |

| | |
|---|---|
| CONSTITUENT CF-CANONICAL-LEXEME | Ali's Truck VIN |
| CONSTITUENT CF-GENUS-CONCEPT | Vehicle Id Number |
| CONSTITUENT CF-SPECIES-CONCEPT | NER |
| CONSTITUENT CF-SPACE-TIME-LOC | STL |

FIG. 17

Synonym Set

| CF-CANONICAL-LEXEME | Truck |
|---|---|
| CF-GENUS-CONCEPT | Vehicle |
| CF-SPECIES-CONCEPT | Truck |
| LEXEME-IN-SENTENCE | Truck |
| CF-CANONICAL-LEXEME | Truck |
| CF-GENUS-CONCEPT | Vehicle |
| CF-SPECIES-CONCEPT | Truck |
| LEXEME-IN-SENTENCE | Lorry |
| CF-CANONICAL-LEXEME | Truck |
| CF-GENUS-CONCEPT | Vehicle |
| CF-SPECIES-CONCEPT | Truck |
| LEXEME-IN-SENTENCE | 18-Wheeler |
| CF-CANONICAL-LEXEME | Truck |
| CF-GENUS-CONCEPT | Vehicle |
| CF-SPECIES-CONCEPT | Truck |
| LEXEME-IN-SENTENCE | Van |

FIG. 19

4426-1 Space Debris Story : There is so much junk in space that collisions could start to increase. [previous slide] S: [question type 10] Has a collision ever happened? A: Yes it has happened that spacecraft have collided! In 2009 a U.S. Iridium communications satellite collided with the broken Russian spacecraft Cosmos 2251. When two pieces of junk collide, they can break apart into many smaller pieces, significantly increasing the amount of debris in space.

4426-2 Dependency Grammar for sentence from Space Debris Story 4426-1: In 2009 a U.S. Iridium communications satellite collided with the broken Russian spacecraft Cosmos 2251.

Dependencies are displayed as dependency name + ( dependency pair) with a number indicating position in given sentence.

root(ROOT-0, !-1) case(2009-2, In-1) nmod(collided-8, 2009-2) det(satellite-7, a-3) compound(satellite-7, U.S.-4) compound(satellite-7, Iridium-5) compound(satellite-7, communications-6) nsubj(collided-8, satellite-7) root(ROOT-0, collided-8) case(2251-15, with-9) det(2251-15, the-10) amod(2251-15, broken-11) amod(2251-15, Russian-12) compound(2251-15, spacecraft-13) compound(2251-15, Cosmos-14) nmod(collided-8, 2251-15)

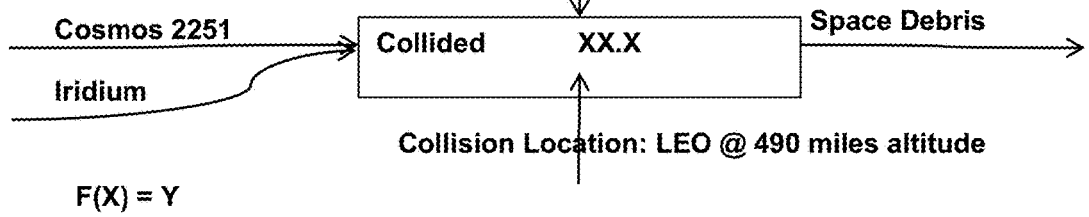

FIG. 20

*4426-4 Software Instruction*
*############ JPEG Image Display*
*##########################################*
cap.release()   *# When everything done, release the video capture object*
cv2.destroyAllWindows()
cv2.namedWindow('image_window_name', cv2.WINDOW_NORMAL)
cv2.resizeWindow('image_window_name',1120, 630)  *#width, height*
img = cv2.imread('apic0.jpg',1)  *### Load image==img  1= color image, 0 = grayscale, -1 unchanged*
cv2.imshow('image_window_name',img)
cv2.waitKey(100)
*############ JPEG Image Display*
*##########################################*

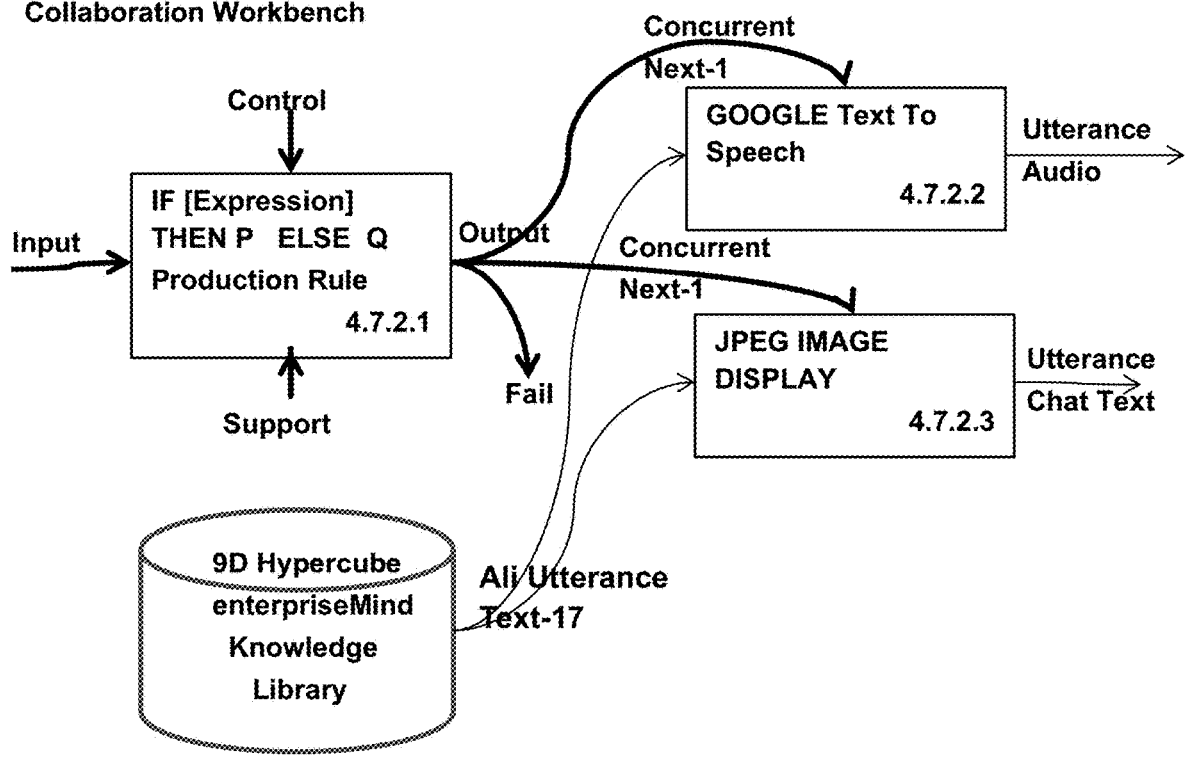

FIG. 21

| 4426-6 Cognitive Structure  EXAMPLE: Ali-Tutor | | |
|---|---|---|
| Container-Hierarchy | enterpriseMind (Library) | Space Science (Curriculum) |
| Container-Hierarchy | Space Science (Curriculum) | Space Debris Tutorial (Lesson) |
| Container-Hierarchy | Space Debris Tutorial (Lesson) | Kessler Syndrome (Topic) |
| Container-Hierarchy | Kessler Syndrome (Topic) | Kessler History (Scene) |

Container-Owns-Story   Kessler History (Scene)       Kessler History #17 (Event)

Story-Sentences   Kessler History # 17  P4.7.2.2  Google TTS  OUTPUT =
        Ali Utterance Text-17-Audio
Story-Sentences   Kessler History # 17  P4.7.2.3  JPEG Image Display  OUTPUT =
        Ali Utterance Text-17-Image
Story-Sentences   Kessler History # 17  P4.7.2.1  Production-Rule OUTPUT=
        SIMULTANEOUS  CONTROL (P4.7.2.2  AND P4.7.2.3)  ELSE Fail
Story-Sentences   Kessler History # 17  P4.7.2.1  Production-Rule CONTROL = Start
Story-Sentences   Kessler History # 17  P4.7.2.2  Google TTS INPUT =
        Ali Utterance Text-17
Story-Sentences   Kessler History # 17  P4.7.2.3  JPEG Image Display INPUT =
        Ali Utterance Text-17

Story-Verb-Simulation-Process P4.7.2.2  Google TTS  + Ali Utterance Text-17 + (input)
Story-Verb-Simulation-Process P4.7.2.2  JPEG Image Display Text-17 + (input)

Story-Owning-Process Model   P4.7.2 Teacher Collaboration Workbench

---

*4426-7  Entity MHC -- Automated Tutorial Elements*
1. Transform Process
2. Production Rule Process
3. Chat Window Process
4. Button Process
5. Text Dialogue
6. Image
7. Video
8. Music

SYSTEM AND METHOD FOR UNDERSTANDING HUMAN LEVEL MEANING USING A 9-DIMENSIONAL HYPERCUBE OF COGNITIVE FRAMES

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The disclosed technology relates generally to artificial intelligence and computer processing and more specifically to generating action instructions based on cognitive learning using pre-existing and updateable data sets.

BACKGROUND

The "Tower of Babel" problem is the Data technology problem that data stores, whether Unstructured Data like Big Data, text documents, natural language discourse, web sites or Structured Data like relational databases do not carry meaning with their data. That is, computer systems do not understand the meaning of their data. Developers of these systems rely on humans to read and understand their meaning and then build their understanding into software that manipulates the data. The consequence of computer systems not understanding meaning is that data is not understandable within data stores or between data stores.

Heterogeneity, i.e., differences in data structure, data morphology, word sense ambiguity and semantics combine to cause the same meaning in two different data stores to be mutually unintelligible. The effect is that each data store "speaks a different (coded) language". Since computer systems do not understand the meaning of the data that they store, human manual engineering and ad hoc tools are required to integrate data, fuse data or analyze data. This is the consequence the "Tower of Babel" problem. For large data stores, "Tower of Babel" solutions typically require hundreds of years of engineering effort. Many of these problems are so large that they cannot be accomplished with current technology.

There is no prior art providing an automated solution to this problem. Approaches to understanding meaning in unstructured data require resolution of lexical string (word) ambiguity as a first step. Two widely used and well known approaches are WordNet at Princeton and FrameNet at Berkeley. WordNet is a lexical database that attempts to solve for lexical string ambiguity by providing "synsets" that group lexical strings into "cognitive synonyms". On average, English lexical strings have about 7 different meanings. The word "run" has 179. WordNet has been built manually with human understanding. The accuracy of the "cognitive synonyms" does not account for ambiguity nor does it account for ontological relationships. This approach is very, very limited in usefulness.

FrameNet at Berkeley was developed by Charles Fillmore and provides a more robust approach to meaning because it includes both words and sentences. It is an attempt to link the meaning of a word to its grammatical function in a sentence. Fillmore's observation was that word sense and therefore disambiguation is semantically dependent on the sentence in which the word appears. Fillmore called this (sentential) Frame Semantics. Fillmore, Charles J. (1968) "The Case for Case". However, Fillmore developed Frame semantics within the context of Chomsky's TG (Transformational Grammar) and treated Frame Semantics as surface structure. He did not develop any mechanisms beyond TG to explain Frame Semantics. FrameNet is therefore an annotation of sentences and words built with human understanding. Without mechanisms or a theory of mechanisms it is not computable and therefore cannot be used to compute meaning-data maps.

Machine learning has been applied in computational linguistics to learning sentences and sentence recognition. It has achieved recognition of about 70% for limited domains. The algorithms have not generalized and successful recognition systems are not able to use the meaning recognition for automating work like data integration, data fusion or data analytics. Crucially, machine learning does not account for human's ability to perform "one-shot" concept formation which is the basis for human level concept induction.

The "background" description provided herein is for the purpose of generally presenting the context of the disclosure. Work of the presently named inventor, to the extent it is described in this background section, as well as aspects of the description which may not otherwise qualify as prior art at the time of filing, are neither expressly or impliedly admitted as prior art against the present invention.

There is no related art in general purpose AI (Artificial Intelligence) precisely because the issue of meaning has not been solved. AI, as currently practiced, has been the history of what Allan Turing called the "imitation game". That is, computer systems have been able to pass one of Turing's proposed tests like playing chess (IBM's Deep Blue), but were unable to hold a conversation, a second Turing test, because human guidance was necessary to solve each point application problem. In practice, each point solution required elaborate human specification and programming because the computer did not have access to the meaning of what it was doing. Without meaning, each point solution is nothing more than an elaborate programming challenge and not artificial intelligence in the human sense.

As such, there exists a need for a method and apparatus providing for determining a meaning of data. The need further includes generating the meaning of data for actionable computing operations beyond existing limited AI techniques.

BRIEF DESCRIPTION

Where prior art techniques are limited in the ability to analyze and determine the meaning of data, the present invention uses computerized processing techniques for transforming data sets into meaning. The meaning, being contextually aware, provides for cognitive learning and true artificial intelligence. Therein, the method and system provides for actionable electronic computational results based on this true artificial intelligence.

The present invention provides for a computerized method for generating an action instruction based on cognitive learning. The present computerized method and apparatus operates in a computer processing environment including using distributive data storage and data access techniques as noted herein.

The present method and system provides for accessing at least one neural network having a data set stored therein. The term data set can refer to any number of data set(s) across any number of storage locations. As noted in further detail below, the data sets can be any suitable type of data, including structures and/or unstructured data.

Therein, the present method and apparatus electronically determines at least one meaning data map of the data set. The meaning data map includes a plurality of cognitive frames that are embedded within a multidimensional hypercube. For example, one embodiment may include a four frames making up a four dimensional cognitive dimension grammar that is embedded within a nine dimensional hypercube.

The method and apparatus calculates a data meaning based on the at least one meaning data map. From this data meaning, the method and system then generates an electronic action instruction. By way of example, action instructions can be data transformation instructions, data integration instructions, and/or data fusion instructions.

As used herein, the present method and apparatus may also be referred to by the name "enterpriseMind." Whereas, the use of the term "enterpriseMind" represents an exemplary embodiment of the method and system and is not an express limitation for a single limited embodiment.

More specifically, the disclosed invention is a method and apparatus for general purpose AI (Artificial Intelligence) that can perform many human level computing tasks from different task domains including, for example, human level data engineering including data architecture, data integration, data fusion, data ETL programming and data analytics. EnterpriseMind's meaning method learns, classifies, organizes and maps the cognitive meaning of data and uses that meaning to perform other human level tasks like programming and data engineering including data transformation, data integration and data fusion. The steps include, for any unstructured data or structured data, calculating a meaning-data map that identifies data meaning.

Data can be from any suitable source, including but not limited to structured databases, Natural language, Procedural knowledge, Declarative Semantic knowledge and Declarative Episodic knowledge database(s).

EnterpriseMind Meaning consists of a 4D-CMG (4-Dimensional Cognitive Meaning Grammar) implemented by a 9D-MHC (9-Dimensional meaning hypercube) including neural networks that are data stores and contain a homeomorphic map onto the data set being learned. The 4D-CMG consists of four cognitive frames one each for word-concepts, sentences, stories, and facts. Each 4D-CMG frame type has meaning expressed as concepts composed of measurable quantified n-tuple properties organized in composable frame structures appropriate to the dimension. The 4D-CMG is the production rule grammar that composes each 3D hypercube into another level 3D hypercube. Thus, a level-1 Entity hypercube is composed into a level-2 Transformation hypercube which in turn can be composed into a level-3 Process hypercube.

The properties can be any measurable entity, e.g., algorithm, image, shape, color, motion, sound or lexical-string. Each 4D-CMG frame contains links to processing algorithms that learn, classify, organize and map meaning for those properties in that dimension.

The 4D-CMG is used to perform data engineering tasks like data transformation, data integration and data fusion. Procedural knowledge is stored in the 4D-CMG which is used to perform data engineering tasks like data programming, data transformation, data integration and data fusion. enterpriseMind is self-referential so that stored procedural knowledge can be changed by enterpriseMind during execution of the procedural knowledge. The Data Transformation method calculates a homeomorphism between the meaning-data map for unstructured data and structured data called the Transform Meaning Map.

The Data Integration method calculates the Integration Meaning Map which is the union, including generalized concepts, of the meaning-data map in the source data sets. The Data Fusion method calculates a Fusion Meaning Map for the most frequently occurring entity in a data set and then the union of meaning within the data set for that entity. All these Meaning Maps are passed to the enterpriseMind Data Engineering generator method. It uses the Meaning Maps to generate target data structures, ETL (Extract, Transform and Load) SQL software code and then executes the ETL code loading the data into the target data structures.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

FIG. 4 illustrates block diagrams of a Story Process Syntax, Claimed Loss Story Process Frame, Made Claim Sub-story Frame, and Claimed Loss Story Text;

FIG. 6 illustrates a WORDNET example for "Party"

FIG. 8 illustrates a Meaning Method Learns Data Meaning & Maps Meaning to Data—Sub-Steps Learn Fact Data Word-Concept Meanings;

FIG. 9 illustrates a Meaning Method Learns Data Meaning and Maps Meaning to Data—Sub-Steps Learn Fact Data Sentence Meanings;

FIG. 10 illustrates an Induction Learning Sub-steps Learn Word-Concept Meanings;

FIG. 11 illustrates an Induction Learning Sub-steps Learn Sentence Meanings;

FIG. 12 illustrates an Induction Learning Sub-steps Learn Story Meanings;

FIG. 16 illustrates Metaphysical and Physical Entity MHC dimensions.

FIG. 17 illustrates Linguistic Entity MHC dimensions.

FIG. 19 illustrates Language properties of Transform MHC.

FIG. 20 illustrates Software Instruction and Product Rule Model.

FIG. 21 illustrates Story MHC knowledge structure.

Figure 1:
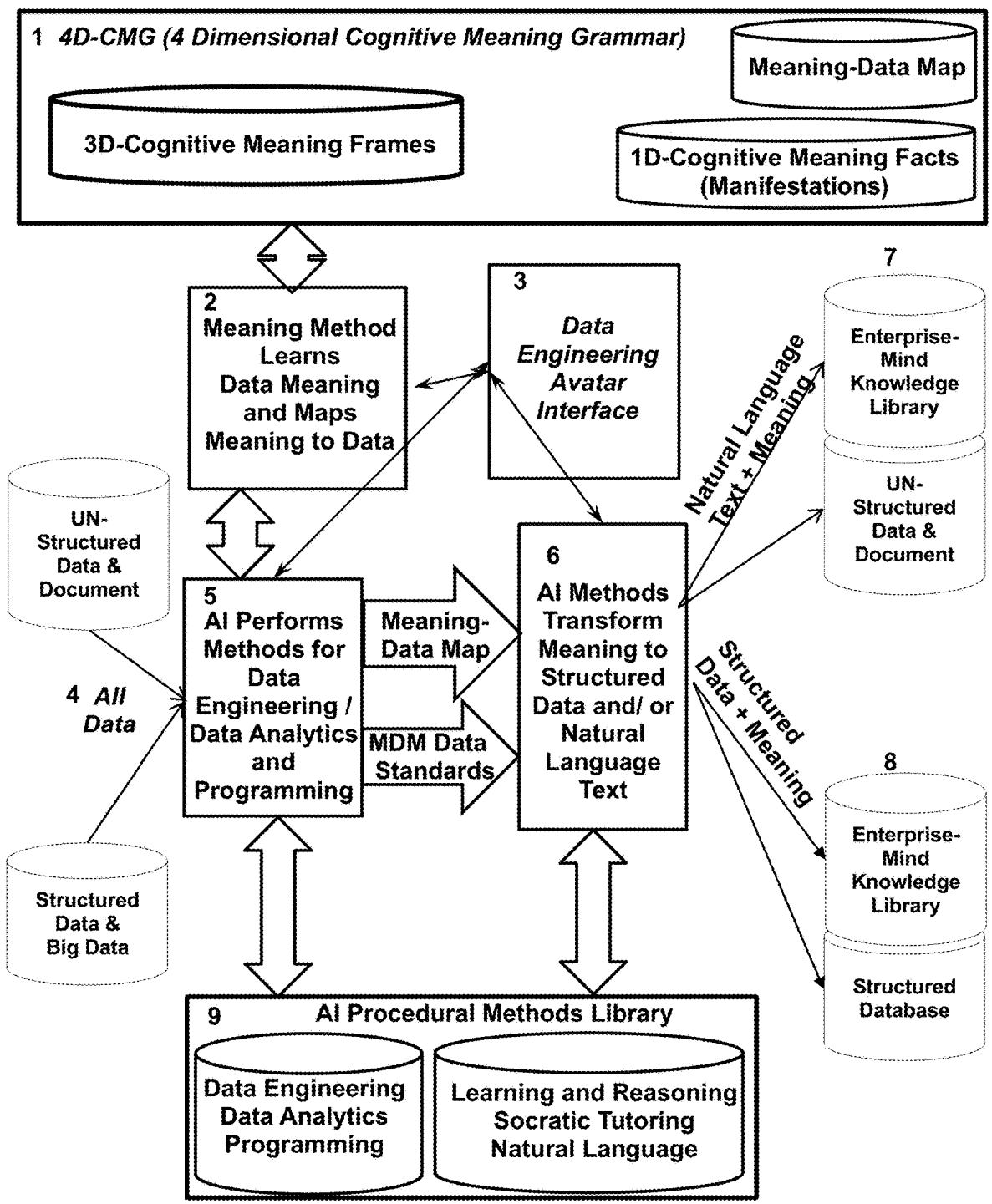
FIG. 1 illustrates one embodiment of the enterpriseMind Overall Organization & Dataflow.

A better understanding of the disclosed technology will be obtained from the following detailed description of the preferred embodiments taken in conjunction with the drawings and the attached claims.

DETAILED DESCRIPTION

Referring to the drawings, like reference numerals designate identical or corresponding parts throughout the several views. The foregoing discussion discloses and describes merely exemplary embodiments of the invention. As will be understood by those skilled in the art, the invention may be embodied in other specific forms without departing from the spirit or essential characteristics thereof. Accordingly, the disclosure of the invention is intended to be illustrative, but not limiting of the scope of the invention, as well as other claims. The disclosure, including any readily discernible variants of the teaching herein, define, in part, the scope of the foregoing claim terminology such that no inventive subject matter is dedicated to the public.

FIG. 1 illustrates a block diagram of one embodiment the disclosed method and system. The block diagram illustrates a 4D-CMG, element 1, executable block 2 for meaning method learns data meaning and maps meaning to data, executable block 3 of data engineer avatar interface, and data in stores 4. Executable block 5 indicates AI performing method for data engineering, data analytics, and programming, with block 6 for AI methods for transforming meaning to structure data and/or natural language text. Storage elements 7 hold natural language texts and meaning, where storage elements 8 hold structured data and meaning. Block 9 is an AI procedural method library.

FIG. 1 illustrates enterpriseMind's overall artificial intelligence method, dataflow, functional architecture and 4D-CMG (4 Dimensional Cognitive Meaning Grammar) apparatus. Stores 4 is the data source which can be any kind of human knowledge including Procedural knowledge or Declarative knowledge both semantic and episodic. The data can be in unstructured form like natural language text or Big Data sets or structured form like relational databases tables. The types of files in data sets can include images, video, audio, natural language text and structured data.

The present method and system is executable within one or more computer processing environments. As described in further detail herein, unitary or distributed computer processing devices perform processing operations in response to executable instructions. In one embodiment, operational steps are performed in one or more neural networks with data stores being local and/or remotely stored, such as any number of cloud-based or network-based data storage locations. The actionable results of the processing operations provide computational instructions usable by processing devices for performing additional operations.

Block 1 is the 4D-CMG. It is a data store for the cognitive meaning of human knowledge plus the facts that the meaning explains. In one embodiment, it is carried in 4 dimensional frames one each for: Word-Concept Frames; Sentence Frames; Story Frames; and (Data Set) Fact Frames. Facts also called Manifestations and are organized as a separate data store since there are an unlimited number of facts for each set of 3D-Cognitive Meaning Frames, e.g., the sentence "Margo bought auto-insurance" can be explained by four concept frames, one for each word, one sentence frame and one story frame of requiring 0.05 MB of storage. However, a typical insurance policy database of corresponding facts may require 10,000 MB of storage.

A meaning-data map is created by annotating the facts with the nine meaning frames that explain them. Library 9 is the method that learns cognitive meaning, learns data source facts and creates the mapping between cognitive meaning and data source facts. This Meaning-Data map is called intelligent data. Executable block 5 is the method that uses intelligent data to perform data engineering tasks, such as human-level tasks, like data architecture, data store design, data integration, data fusion, MDM (master data management) tasks like standardizing data properties and ETL (Extract, Transform and Load) data programming.

Procedural knowledge is stored in the 4D-CMG which is used to perform data engineering tasks like data programming, data transformation, data integration and data fusion. enterpriseMind is self-referential so that stored procedural knowledge can be changed by enterpriseMind during execution of the procedural knowledge. For example, as described in greater detail with respect to FIGS. 15-21 below, using a nine dimensional meaning hypercube (9D-MHC) of declarative knowledge, the 4D-CMG grammar production rules (procedural knowledge) can transform that knowledge to perform data engineering tasks like data integration of two databases. The 9D-MHC declarative knowledge is thus operated on by the 4D-CMG procedural knowledge grammar to do work.

In one embodiment, the blocks 5 and 6 are operative to perform action instructions based on the determined meaning of the data set as described herein. Executable block 5 outputs MDM standardized data and intelligent data. Executable block 6 transforms the structure of data while preserving its meaning. Transforms produce two kinds of results: structured data and/or unstructured data for the same meaning. For example, structured data tables can be integrated with natural language text in method of block 5 and then the result can transform into unstructured data in store 7 or structured data tables for data analytics in store 8. Alternatively, the integrated result can be transformed into natural language for human dialog or natural language search in store 8.

As used herein, action instructions can be an electronic or computerized result electronically and programmatically generated using the data understanding operations noted herein. The action instructions can include executable instructions usable for other processing systems to perform processing operations. The action instructions can include functional instructions for additional processing operations, such as self-referential learning for example.

Methods executable in block 5 and block 6 execute behaviors stored as procedural knowledge in library 9. This procedural knowledge uses the same 4D-CMG cognitive structures that store cognitive meaning about fact data. The 4D-CMG structures are formally and logically a superset of colored petri nets which are finite state machines. Therefore they can implement concurrent computer systems models, programming and simulations.

In this embodiment, executable block 3 is the control interface for enterpriseMind's overall method.

Figure 2:
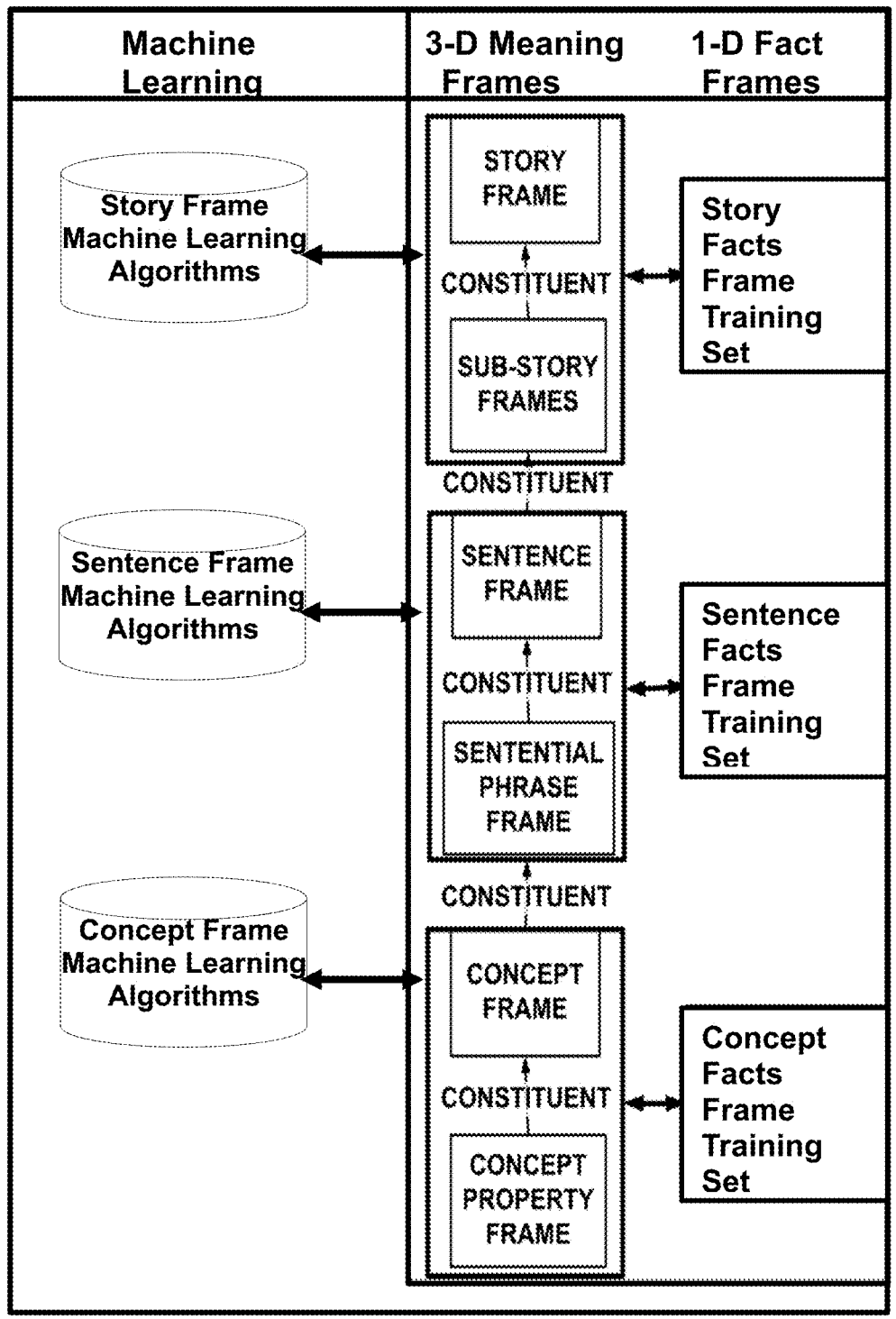
FIG. 2 illustrates block diagrams of one embodiment of a Cognitive Structures for Self Organizing Meaning.

FIG. 2 Illustrates a key element in enterpriseMind: a single knowledge structure to hold human knowledge with built-in machine learning that learns the knowledge. It is called a 4 Dimensional Cognitive Meaning Grammar or 4D-CMG and it consists of three frame structures for knowledge meaning: Word-Concepts, Sentences and Stories and one frame structure for knowledge Facts. Meaning is mapped onto facts creating a meaning-data map. The 4D-CMG is realized as a data store in a computer system. The 4D-CMG data store is a virtual data construct and in practice can contain an unlimited number of physical data stores.

The three meaning frames of 4D-CMG model the following kinds of knowledge: Declarative Semantic Knowledge as Concepts, Declarative Episodic Knowledge as Event Sentences and Procedural Knowledge as Story Processes. Each of these meaning frames has a corresponding fact frame that matches the internal structure of that frame's dimension. Each of the three meaning frames has its own machine learning algorithms with training data sets embedded with the knowledge so that it can learn the kind of knowledge that it stores and continuously improve its performance classifying and learning.

Another key element of enterpriseMind is that the meaning of meaning is measurable values. The present method and system does not process labels (lexical strings) of words or sequences of labels for sentences or stories, but rather actual measurements of constituent concept properties. Word disambiguation is therefore precisely about the properties attributed to the word and not a search of labels or context. This allows machine learning to learn concepts causatively and inductively, i.e., meaning composed of collections of measured properties.

Figure 3:
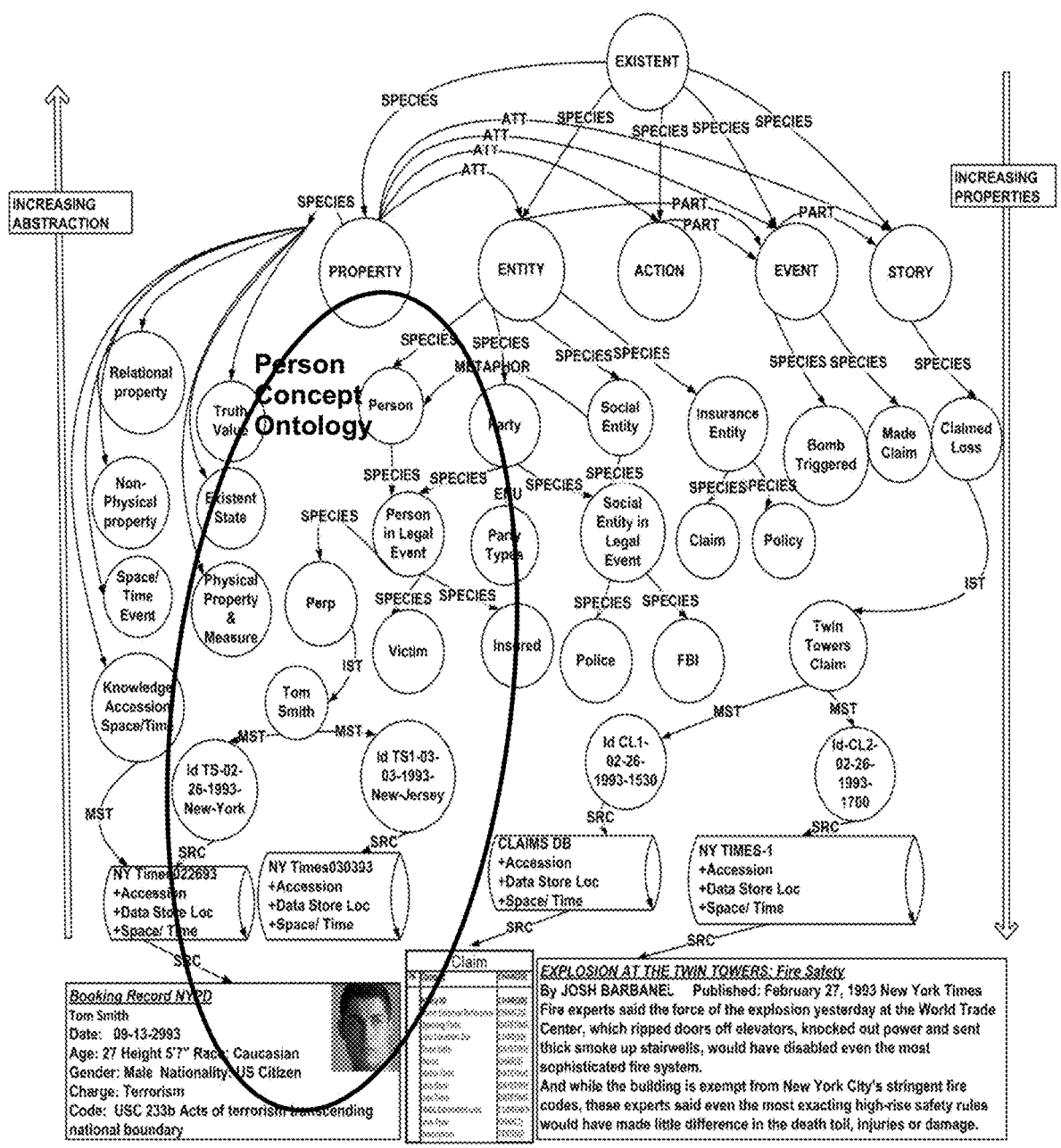
FIG. 3 illustrates block diagrams of one embodiment of a Self Organizing Cognitive Structure & Calculated Ontology.

The cause of the meaning of a concept, sentence or story is its measurable properties. The basic property list is seen as species of property concepts in FIG. 3 illustrating Self Organizing Cognitive Structure and Calculated Ontology. The meaning frames consist of primitive properties learned using machine learning algorithms, such as for example but not limited to Support Vector Machines.

The primitive properties are then composed into concepts, sentences or stories and learned using machine learning algorithms like Bayesian Program learning. In one embodiment, each Frame has its own machine learning algorithms and training data set which learns to improve as it learns new facts and updates its algorithms and training data set.

FIG. 2 illustrates the 4D-CMG cognitive structure with its machine learning components. The Frame Structure Stack on the right of FIG. 2 shows the cognitive structures. Each has embedded links to data stores for machine learning algorithms with their training sets that learn each cognitive structure. Training sets and algorithms are updated as new Stories, Sentences and Concepts+their associated facts are learned. The three dimensions of meaning frames each have an internal structure. Concepts consist of measured constituent properties that are composed into the concept. Considered as a set, the properties are the tests for set membership. The concept's differentia is those properties that belong to its superset and the concept's species properties are unique non-shared properties. The concept frame's ontological learning algorithm is thus able to calculate the ontological knowledge hierarchy dynamically on the basis of properties and set membership: a subset concept, the species of an owning superset concept, has all the properties of its owning superset. As described in greater detail below, for example FIG. 16 and the Physics Concept Properties traces a relationship between variant properties. This supports induction of new concepts from fact properties, generalization connections between concepts using differentia and deductive concept property verification.

In FIG. 2 Concept Frames are constituents of Sentential Frames. Sentential Frames are rendered as one or more phrase structure (constituent) grammar components of like NP (Noun Phrase), VP (Verb Phrase) and PP (Prepositional Phrases). The internal structure of Sentential Frames phrase structure is treated as a modification (dependency) grammar, e.g., the head verb in a VP has argument properties with selectional restrictions driven by the verb's properties that restrict the verb's grammatical function arguments both subject and object. For example, the verb "make", has an unrestricted object argument and a restriction that the subject concept must have an agentive property.

Sentential frames are composed into a Sentence. Different kinds of phrase's machine learning algorithms learn phrase structure constituents and learn to compose them into sentences. Each Sentence Frame has its own machine learning algorithms and training data set which learns to improve as it learns new facts and updates its algorithms and training data set.

In FIG. 2 Sentence Frames are the constituents of Sub-Story Frames which are the constituents of Story Frames. Sub-Story and Story Frames model procedural knowledge and are logically and in one embodiment are formally a superset of Colored Petri Nets. They are thus finite state machines which can model software code or other process knowledge. In one embodiment, each Story Frame has its own machine learning algorithms and training data set which learns to improve as it learns new facts and updates its algorithms and training data set.

FIG. 3 graphically illustrates the kinds of knowledge and the cognitive structure including the ontology, indicated by the species edges for the knowledge in the 4D-CMG. enterpriseMind ontologies are calculated based on concept measured properties as previously described. As shown in FIG. 3, an example person concept ontology stack is labeled. The top of the knowledge structure is an Existent which is anything that exists. Species of existent are: Concept Properties; Concept Entities; Concept Actions; Event Sentences; and Story Processes. These five knowledge structures correspond to and are stored in the cognitive structure Frames in FIG. 2.

In one embodiment, Concept Properties are represented by eight species of properties as shown in FIG. 3. In this example, the sample properties encircled in FIG. 3 include: (1) relational property; (2) non-physical property; (3) space/time event; (4) knowledge accession space/time; (5) truth value; (6) existent state; (7) physical property (type); and (8) physical property measure.

BCS (Biological Common Sense) properties are those properties that most humans know, but that rarely appear in descriptive text. They consist of perceptual properties like liquid, gas or solid or active agent that are necessary for reasoning about selectional restrictions for verb subjects and objects. BCS properties are manually curated during construction of concepts and are inherited by all concepts through ontological linkages illustrated in FIG. 3. In principal, there are an unlimited number of kinds of concept properties and these eight are merely illustrative. Note that the top level concepts are related by PART edges describing the cognitive structure relationships shown in FIG. 2.

The example concepts shown as species of these concepts are knowledge from an Insurance Domain. These species linkages cascade down the ontology until they connect to Facts with an IST (Instance) edge. An instance is a named entity that is represented by one or more MST (Manifestations) connected by MST edges. Manifestations are factual knowledge that occurs at some particular space/time location. For example, Party-1 is the concept of a person in a legal event (disambiguated by its properties from Party-2 which is a company in a legal event). It has a species called Perp (Perpetrator). An IST of Perp is the named entity Tom Smith. An MST of Tom Smith is the police booking record when he was arrested for bombing the World Trade Center in 1993. In a like manner, the Story Process called Claimed Loss, which is an insurance claims process, has an IST called Twin Towers Claimed Loss which has two MSTs: a Twin Towers Claimed Loss Insurance database record and a New York Times newspaper article describing the Twin Towers Claimed Loss as the 1993 bombing of the World Trade center in New York.

FIG. 4 illustrates multiple sequences in data processing within the scope of the invention herein. Block 10 illustrates one embodiment of a syntax of a Story Process as a transition network which is formally equivalent to a Colored Petri Net and has the power of a finite state machine. Note that each edge or process node in the syntax is a concept and as such has a Concept Frame property list that defines it. For example, a process can be the algorithm for the function F(x)=2x and the input can be a real number.

Block 11 illustrates the Made Claim Sub-Story which is a single node in the a Made Claim Story. enterpriseMind Story Frames Processes are used to model and execute natural language conversation, full text natural language stories and data engineering process such as SQL ETL (Extract, Transform and Load) code generation, data integration and data fusion.

Block 12 illustrates the Claimed Loss Story as a cognitive structure using the Story Process syntax. Text in block 13 is the equivalent text story for block 12. In one embodiment, the enterpriseMind Frames support an inverse between models such as block 12 and text such as block 13, which provides that: "Tom Smith triggered a bomb at 2 World Trade Center in New York on Feb. 26, 1993 at 1530 hours. The building burned. Many people were injured. On Mar. 1, 1993 the owners filed a loss claim with AIG their insurance company. The police reported that they had arrested the alleged perpetrator Tom Smith on Wednesday at 1900 hours."

Figure 5:
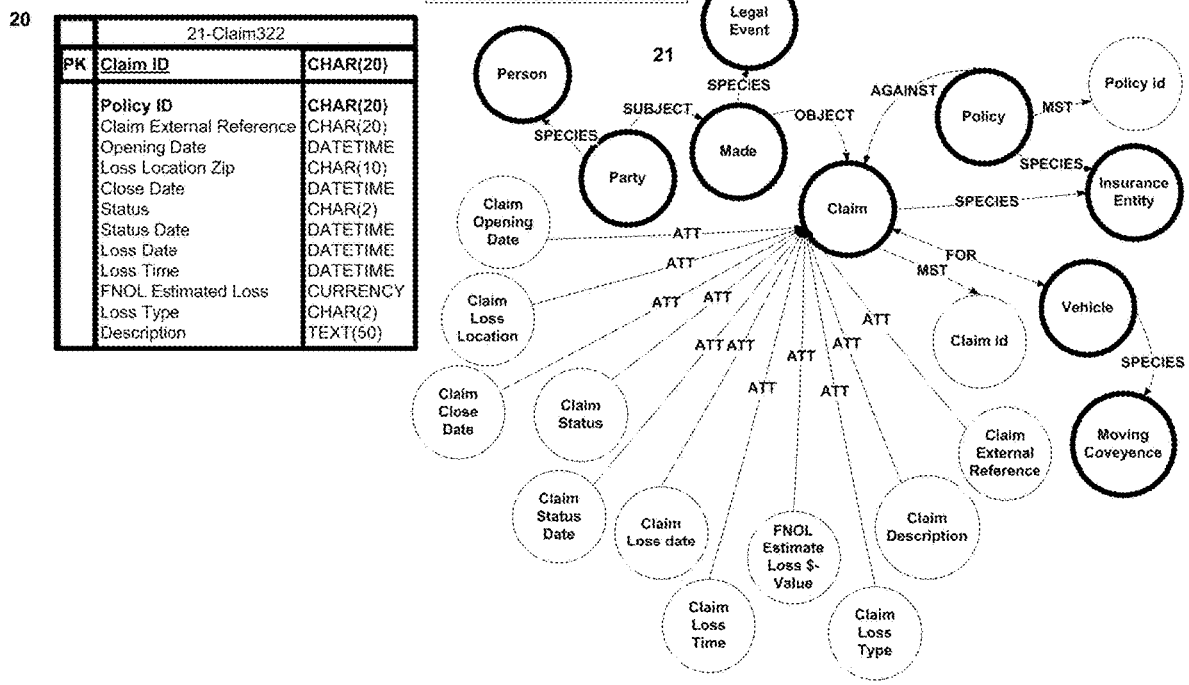
FIG. 5 illustrates block diagrams of one embodiment of a Made Claim Sentence Version 1 and Database Tables Underlying Cognitive Meaning Structure.

FIG. 5 illustrates on embodiment of a Sentence Frame cognitive structures for the Made Claim sentence. Included are the constituent concepts which refer to Concept Frames and sentential phrase frame structures. FIG. 5, text block 15 is an example fact (manifestation) sentence for Made Claim broken into its constituent phrase structures which are identified in FIG. 5, block 17.

Stories, which in enterpriseMind are, in one embodiment, a superset of Colored Petri Nets, require identification of Support, input, output and process. This identification is performed by identifying the grammatical function of phrases in a sentence. FIG. 5 blocks 18 and 19 show the equivalence between grammatical functions and story functions.

FIG. 5, block 20 illustrates the directed graph in heavy black circles around nodes for the Made Claim cognitive structure. Note that the concept nodes in heavy black circles include both the grammatical function as edge labels in phrase structure and a fragment of the ontology as species labels. The 4D-CMG cognitive grammar contains ALL ontological edges and nodes for the Made Claim sentence, but only a few are shown to de-clutter the model.

A key idea in enterpriseMind is the meaning-data map. This map assigns a cognitive structure like FIG. 5 block 20 to both database tables and sentences. This map allows transformations between unstructured data (like text sentences) and structured data (like relational database tables) and is the cognitive model equivalence between sentences and database tables. That is, all database tables have meaning-data map cognitive structure that describes their meaning. Indeed, the sentence phrase structure will not only account for table semantics, but also table structure like repeating groups.

FIG. 5, element 21 is a database table for the Made Claim sentence from an actual Insurance Claims system. It has 13 rows. block 20 with all its nodes and edges is the equivalent enterpriseMind cognitive structure for the Made Claim sentence 15. This cognitive structure explains, in this embodiment, how all 13 items in the table are related: 11 rows are attributes called properties of the claims concept and the remaining 2 rows are manifestation identifiers for claim and policy manifestations.

Manifestations are events in space/time. They are Facts as opposed to cognitive structures that explain meaning. Block 21 is the ERD for an actual database table that holds Facts. The block 20 is a cognitive structure that explains meaning because all its supporting frames have measurable meaning properties.

Block 15 is a Fact. Manifestation (Fact) id's in the Made Claim cognitive structure, 20, identify specific facts in database tables. In this embodiment, they are beneficial because there are potentially an unlimited number of facts all with the same cognitive structure. The manifestation ids allow databases to uniquely identify them. In practice any Frame in enterpriseMind's 4D-CMG can have a manifestation id to uniquely identify manifestations.

In one example, enterpriseMind learns the Made Claim sentence 15 from the Domain language for the Insurance business. This learning requires enterpriseMind to learn the concept properties for each word (lexical string) in the sentence. Block 21 is a database table that contains only a fragment of the full Made Claim cognitive structure, but it is sufficient for enterpriseMind's machine learning to recognize the fragment as the Made Claim cognitive structure. The Made Claim cognitive structure 20 is meaning-data mapped to block 21 the database table and meaning-data mapped to the Made Claim manifestation sentence 15.

Therein, the method and apparatus performs meaning preserving transformations between structured and unstructured data and meaning preserving data integration/data fusion.

Figure 7:
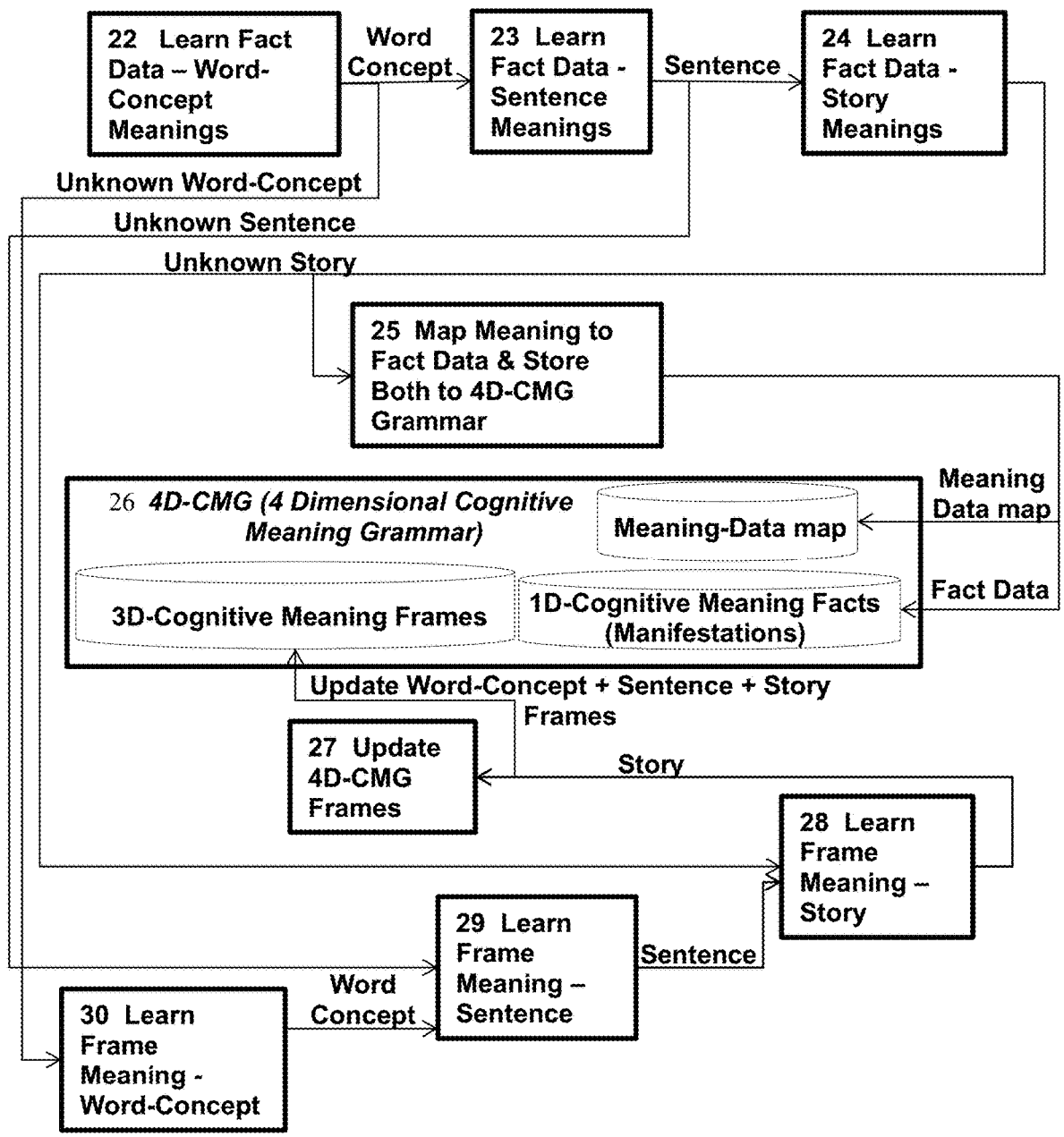
FIG. 7 illustrates block diagrams of one embodiment of a Learn 4D-CMG Frame Meaning.

FIG. 1 illustrates the overall enterpriseMind method which uses the 4D-CMG. It is discussed above. FIG. 7 illustrates a detailed description of the method block 2 of FIG. 1, the "meaning method learns data meaning and maps meaning to fact data" step. This method learns both new facts and the meaning of facts. Some of these steps are, in turn, illustrated on subsequent diagrams. FIG. 7 illustrates the steps in "meaning method learns Fact Data meaning and maps meaning to fact Data. Steps 22, 23, 24 and 25 learn the meaning of fact Data where the 4D-CMG grammar already knows the cognitive structures and machine learning. That is, these are new facts about word-concepts, sentences and stories with known cognitive structure frames. FIG. 7 steps 30, 29, 28 and 27 are steps taken when Fact Data contains unknown word concepts, sentences or stories. In these steps, new cognitive structure frames are learned. This process is fundamentally inductive.

FIG. 8 illustrates the sub-steps FIG. 7, step 22, the Learn Fact Data-Word-Concept Meanings. This step is to classify and disambiguate word-concepts in sentences or data tables by their property tuples within the context of a sentence.

FIG. 8 illustrates the sub-steps for learning Facts about Concept Frames. This process can be shown using the person concept ontology in FIG. 3 through the steps 31-39. This ontology includes a manifestation, a fact, about a specific person named Tom Smith on Dec. 16, 1993. Smith has a set of measurable person properties like a human face image, a skin color, a name and a police booking record. enterpriseMind machine learning is first trained to classify these four properties. Of the four, only skin color is a primitive property: that is, it is irreducible to component properties and can be directly measured as a color wave length. All the other properties are Component Properties: human face image may consist of 100 shape measurements, name may consist of six different lexical strings and police booking record has 6 sub-parts.

enterpriseMind Concept Frames recursively descend (concepts can consist of species concepts) into measurable component parts and relationships until primitive measurable properties are reached. Each primitive property concept has a training set and associated machine learning algorithm stored with its Concept Frame that is added to and re-trained every time a new manifestation is learned as in FIG. 7.

Each Component Property first has its primitive properties measured and classified. These classified primitive property parts and relationships are then composed and classified using a Bayesian learning algorithm to yield Concept Frame components. Thus enterpriseMind concept induction creates a Named Entity concept "Tom Smith" from a single manifestation fact.

FIG. 9, block 40 Illustrates the sub-steps in FIG. 7, block 23, Learn Fact Data—Sentence Meanings. These steps noted in steps 41-44 are to classify (using machine learning) sentence components as phrase structure grammar sentential phrases. Each of these phrases is then classified (using machine learning) with a dependency grammar. Thus sentence frame organization in enterpriseMind classifies sentence phrase structure by grammatical function like SVO (Subject, Verb and Object) and then understands how word-concept modification works with a dependency grammar within the phrase structure.

FIG. 9, block 45. Illustrates the sub-steps in FIG. 7, block 24, Learn Fact Data—Story Meanings. In one embodiment, the enterpriseMind Story Frames are finite state machines, a super-set of Colored Petri Nets. As such, they can specify software code, simulations and manual processes. Story Frames contain procedural knowledge is stored in the 4D-CMG which is used to perform data engineering tasks like data programming, data transformation, data integration and data fusion.

enterpriseMind is self-referential so that stored procedural knowledge can be changed by enterpriseMind during execution of the procedural knowledge. As noted via steps 46-50, Sentences Frames are mapped into Story Frames and are homeomorphic. Sentence verbs can be specified as executable functions in Concept Frames and data/data flow can be specified as data structures as shown on FIG. 5, block 21. Flow of control and conditionals can also be specified in Concept Frames and are shown as inter-sentence controls.

FIG. 10 illustrates steps of Learn Frame Meanings-Word-Concept-Sub-Steps illustrates the sub-steps that learn, inductively, Concept Frame from an unstructured data corpora. These steps, noted via steps 52-59, determine what properties belong to each concept from sentences in a corpora. It relies on definitional sentence forms with the verb to be like "is" and "has" to create a list of properties for each sense of a word. The properties can be of any kind including, for example, the property lists on FIG. 3 property concepts.

The properties are recursively defined and so that complex properties like "an organization is a group of persons" recursively descends to person which descends to "rational animal" which descends to animal which descends to an image. This step requires sentences that employ different senses of a concept to generate machine learning training sets of sentences that map the different senses of a word to their property lists.

FIG. 6 illustrates an example word "party" that has six different property list definitions and six example sentences: S1 to S6. This example is lightly edited example taken from WORDNET a publicly available lexicon. Each sense of "party" has different properties. As enterpriseMind's 4D-CMG learns sentences using "party", its training set grows and so the accuracy of recognizing different senses of a word, i.e., their property lists improves. This disambiguation of word senses based on property lists is a key idea in enterpriseMind.

In FIG. 3 two of the senses of the word "party" are shown in a cognitive structure. Party-1 has the property of being a person and Party-2 has the property of being an organization. In FIG. 6 sentences S5 and S6, notice that the person and organization properties are causative for the different uses of "party" in some, but not all sentences and therefore create, in many cases, an invariant mapping in the machine learning that has 100% probability. This improves system accuracy on learning and classification tasks to very high levels. Indeed, in some cases, "one-shot" concept formation is possible, i.e., creation of a concept and machine learning algorithm from one example. enterpriseMind learns all sentences from a corpora and maps all concepts in each sentence training the machine learning algorithm for each word sense of a concept. Synonyms are equivalenced to concepts with the same property lists. Named entities like "USS Enterprise" or "Barack Obama" are handled as Instances of concept Manifestations with their own property lists and machine learning algorithms: in effect, as concepts.

FIG. 11 block 60 illustrates the sub-steps in Learn Frame Meanings-Sentence Meanings-Sub-Steps. As illustrated through steps 61-66, these steps learn frame and sentence meanings.

FIG. 12 block 67 illustrates the sub-steps in Learn Frame Meanings-Story Meanings-Sub-Steps. As illustrates through steps 68-71, the method therein learns information about the frames and creates training sets.

Figure 13:
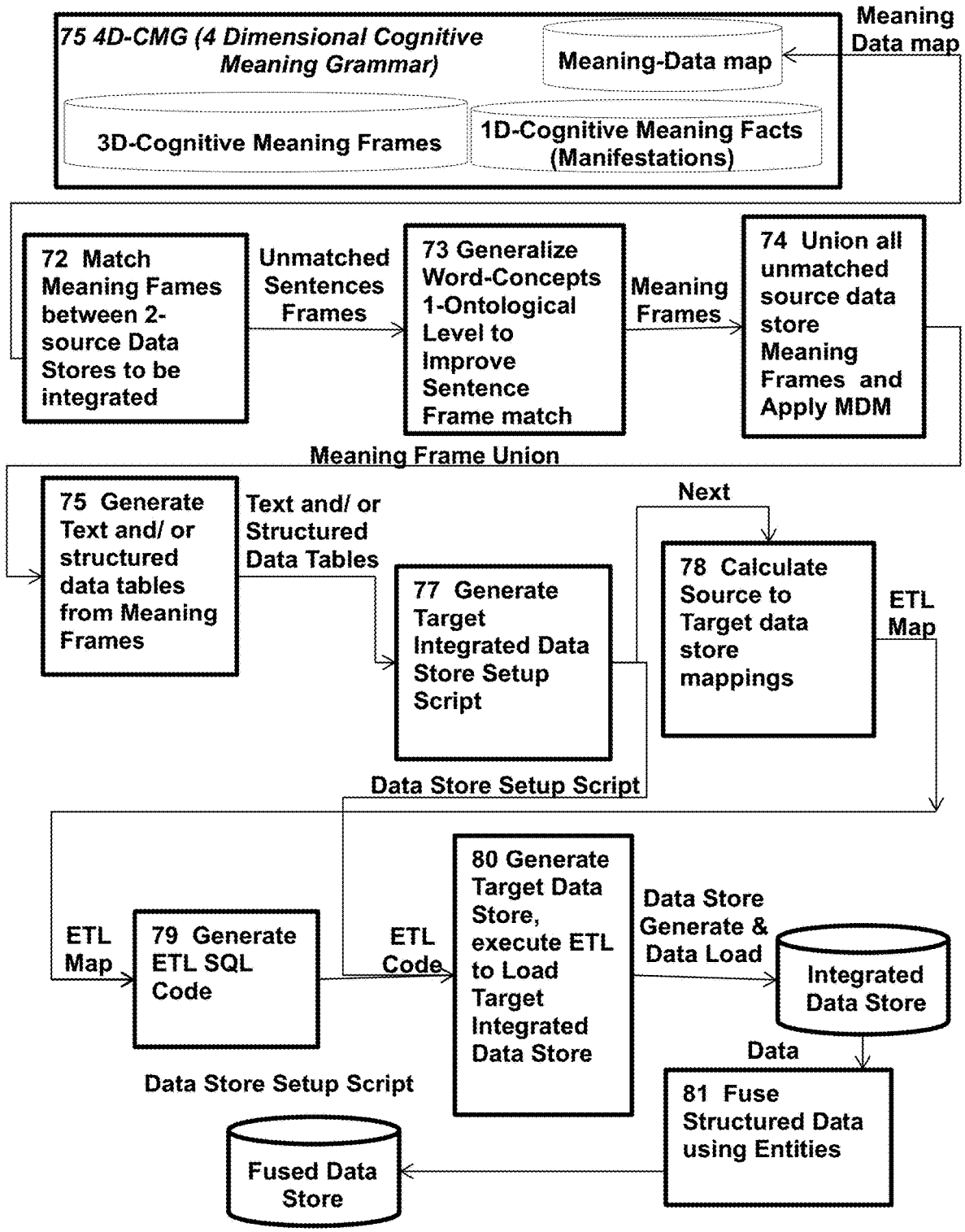
FIG. 13 illustrates block diagrams of one embodiment of AI performing Data Integration, Data Transformation and Data Fusion.

FIG. 13 block illustrates method sub-steps for FIG. 1, executable bock Data Engineering 15 and FIG. 1 executable block Data Transformation 6. FIG. 13, via processing steps 72, 73 and 74 illustrate data store integration which is performed using 4D-CMG Meaning Frames. The present method and system performs data engineering modeling human data engineering, i.e., with Meaning Frames and not with data structures.

The Meaning Frames can be transformed into database Table structures or into Sentence Text. All these methods are homeomorphic with inverses. This can be seen illustrated in FIG. 5 where Data Table 21 is equivalent to Sentence Text 14. The transformative Meaning Frame is illustrated in block 20. In a like manner, FIG. 14. illustrates a Meaning Frame 89, the equivalent Database Table 88 and Sentence Text 82. Thus Data integration is performed by integrating Meaning Frames, i.e., their Word-Concepts, Sentences and Stories. No data in the databases is required to perform the calculation: just the Meaning-Data Maps which contain copies of the 4D-CMG Meaning Frames.

Figure 14:
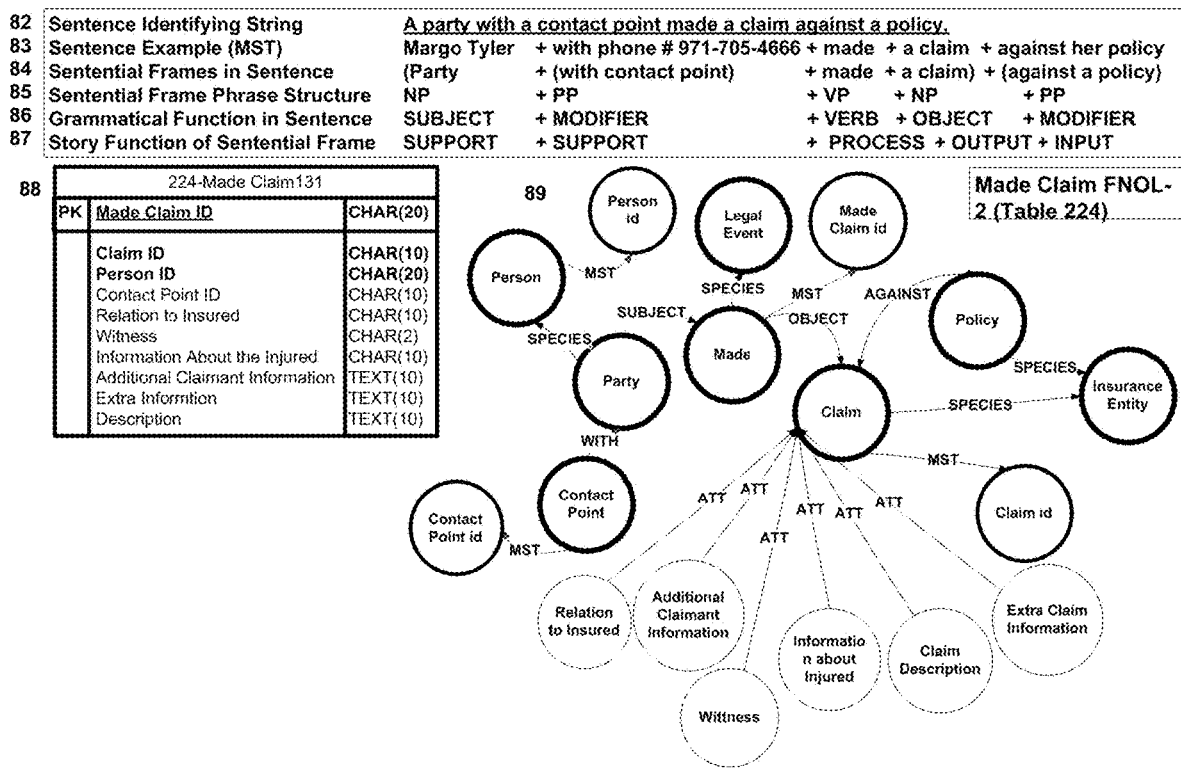
FIG. 14 illustrates Made Claim Sentence Version 2 and Database Tables Underlying Cognitive Meaning Structure.

Data integration is performed by matching the sentences between the two data sources. For example, FIG. 5 and FIG. 14 illustrate two matching Sentence Frames because they match on SVO NP, VP and NP phrases. The other properties of the Sentence Frames are different and as can be seen in FIG. 5 and FIG. 14 they are realized as two different data tables. enterpriseMind can integrate the data sources for both because of the Sentence match into a single data store either as data tables or as text.

The sources can be text, database tables or a combination of both. Because the match is between Sentence Frames containing the same Word-Concept Frames, meaning is always preserved. Sentential phrases outside the core verb and object phrases are simply unioned with the basic sentence. If the integration is going to produce data tables, the additional phrases are treated as attributes of the basic sentence.

Standardization of the computer properties of data such as its field size, data type, data structure, semantic meaning, data label and referential integrity constraints are commonly referred to as Master Data Management standards or MDM. enterpriseMind calculates the MDM standard for each Word-Concept based on the max of the union of encountered data properties and uses that as the MDM standard for ALL ETL code, data stores and databases that it generates. SHEET. 13 #74 illustrates the step in which this calculated MDM is applied.

FIG. 13 steps 75, 77, 78, 79 and 80 illustrate the sub-steps in the method of transforming meaning to text and/or structured data tables in databases or into text data stores.

FIG. 13 step 75 illustrates the generation step for these data stores. If the user selected generation of unstructured text data store, then sentences in the integrated Meaning Frame will be generated directly because they are already specified in the Frame. If the Meaning Frame input was sentence text, then sentences are generated 1 for 1. If the input was structured data tables then sentence text will be generated for each table row, 1 for 1. If the user selects structured data, then structured tables will be generated one per sentence. If the user selected structured data tables and the input was structured data tables, then the integrated data tables in the Meaning Frame union. These tables will be empty until they are loaded in a subsequent step. When structured tables are generated then unique random primary and secondary keys will be generated when manifestation id's are required, but natural keys will be used when they were used in the original data.

FIG. 13, step 77 illustrates generating the target integrated data store setup script. These scripts are DBA scripts necessary to setup datastores and are parametized for different data store platforms like Oracle 11g for structured data or IBM Watson Content Analytics for unstructured data. The parameters are just the slots in the scripts that declare data structures that are calculated from the Meaning Frames. The data store setup scripts are stored in the enterpriseMind procedural library so they can be called at will.

FIG. 13, step 78 illustrates the step that calculates the data source and data target mappings called the ETL Map. These mapping specify which source data table field or sentence is mapped to a target data table field or sentence. These calculations are made based on enterpriseMind recording the source data structure location, the intermediate Integrated Meaning Frame location and then the final target data structure location. Recall that the MDM (Master Data Management) properties for each Word-Concept were established when enterpriseMind learned the Source Data. Thus MDM provides standardized data properties so that when a Word-Concept occurs in the Source Data, even if it has different data properties from other source data with the same word-Concept, it will always have the same values when different Source Word-Concept are integrated and mapped together. The Source and Target mapping are stored in the enterpriseMind procedural library so that they can be called when the ETL code is executed.

FIG. 13, step 79 illustrates the step where ETL programming (Extract, Transform and Load) SQL code is generated. This code reads 22 the Source Data (extracts it), Transforms the data properties using the MDM specification and then Writes to (Loads) the Target Data Structure. The code uses a generalized ETL script which has slots for the appropriate source and target data structures. The MDM transformation specifications are embedded in the ETL script and the transformations are calculated from the MDM specification. The ETL code is stored in the enterpriseMind procedural library so that it can be executed at will.

FIG. 13, step 80 illustrates the step that generates the target Data Store executing the data store setup script and then executing the ETL code to load the data store.

FIG. 13, step 81 illustrates the step that Fuses Integrated Data. Data Fusion means that enterpriseMind links data between different sentences or tables where the Word-Concepts are equal (have the same meaning) and the data values (Manifestations) of the Word-Concepts are equal. Data Fusion is a step that calculates all the information about the same entities in a data store and presents it as a complete story. For example, suppose that a data store contains information about a person, Margo Smith, and her financial portfolio. Several data stores about her stocks, bonds and retirement accounts have been integrated preserving their semantics as in step 80. enterpriseMind Data Fusion automatically links all of Margo Smith's portfolio information providing a complete view of Smiths portfolio. enterpriseMind can perform this step for any entity in the data set.

Data Fusion is calculated by first finding the identical Word-Concept in different sentences or tables in the data set. The second step in Data Fusion is to establish identity between data properties (Manifestations) for the same Word-Concept. Recall that each Word-Concept has a measurable property list stored in enterpriseMind's 4D-CMG. When the data values are equal for the entire property list then the two data manifestations are identical. For example, Margo Smith with the same address property might be the same Margo Smith. However, entities like persons typically have long property lists and so the probability of identity between manifestations is increased when more elements on the property lists match. Machine Learning calculates these probabilities of identity and the user can select the threshold probability for an identity match.

The present method and system operates in any suitable computing environment. One or more processing devices in local or networked distributing processing environments may perform the processing operations described herein. Those operations may be performed in response to executable instructions stored in any suitable computer readable medium. Execution of processing steps does not necessarily occur in a unitary environment or processor, but may be distributed across any number of processors as recognized by one skilled in the art. Moreover, data load distribution algorithms may be utilized to manage computation load as necessary.

The present method and system utilizes data storage for data access and writing functionalities noted herein. Data storage may be any suitable storage, including for example local or network based storage, including for example cloud-based or server-based storage techniques. Additional data access algorithms may be utilized to manage data access and writing for operational steps noted herein.

The present method and apparatus provides for classifying and transforming source data to natural language meaning wherein the source data is of two types: either structured data or unstructured data sourced, for example, from machine readable books, legacy Cobol systems, relational databases, XML, web sites or image files. Data patterns are classified into word-concepts, phrases, or stories with machine learning classifiers which are a part of the enterpriseMind apparatus 4-D CMG (4 Dimensional Cognitive Meaning Grammar).

Data from a structured database follows a perceptual pattern recognition process wherein stored prototypical data values are classified into lexical units with a machine learning classifier, e.g., a support list machine. Because structured databases employ unique identifiers called keys that reference other tables in the database, meaning is dispersed across multiple tables in a structured database. Hence the method assembles a path between tables to arrive at meanings that the classifier machine can use to classify lexical items. Each column in each table is classified into a lexical unit, either a word or a phrase, and the assembled path is used to arrive at consistent meanings across tables.

The present method and apparatus provides for Inductive Learning is performed when data is not recognized by the 4D-CMG. The present method and apparatus performs an induction of the unrecognized structured or unstructured data. The induction is performed by generating the classifying probabilities for the set of classifiers with the smallest numeric difference between each other and with the unrecognized data. The common genus for this set becomes conceptual common denominator for the new concept, i.e., its genus. The species of the new concept is the open interval around the classifier values for the individual data values that manifest the unrecognized concept. A new classifier is trained to recognize the unrecognized data. This creates a new concept, conceptual hierarchy links, classifier model, perceptual prototype data table values and assigns a place holder lexical unit. This information is learned by being incorporated into the 4D-CMG structure and stored in the 4D-CMG KNOWLEDGE LIBRARY.

The present method and apparatus provides for transforming words to 4D-CMG Frames uses the source data words identified in claim 1 and stored in the 4D-CMG KNOWLEDGE LIBRARY. The method identifies or creates 4D-CMG Frames that explain the meaning of a set of lexical units or words. The set of Frames is composed during the process in claim 1 into word-concepts, phrases or sentences or stories. The process described herein uses machine learning classifiers to identify the 4D-CMG Frame that the phrases or sentences manifest. The 4D-CMG frames are unique to the 4D-CMG grammar and incorporate measurable perceptual concretes which grounds the 4D-CMG Frame in an ontology which is itself perceptually grounded. Meaning is made measurable. When the classifiers fail to recognize a phrase or sentence they automatically begin induction to learn the new phrase or sentence. This process creates a new classifier by extracting features sets for each lexical unit in the phrase or sentence from the knowledge in the 4D-CMG KNOWLEDGE LIBRARY.

The feature sets are measurements of all the lexical unit's properties in a corpus of word-concepts, sentences or phrases or stories with the same lexical units. The measurements include all the properties of the constituent concepts. The lexical unit's feature sets are compared to each other to identify the smallest set of common features which is equal to the smallest conceptual distance between lexical features. The classifier is trained on this corpus with these feature sets. This causes the 4D-CMG KNOWLEDGE LIBRARY to learn the new phrase or sentence semantic frame. The result of this process is that a phrase or sentence manifesting specific existents in space-time is mapped to a semantic frame that explains its meaning. This information is stored in the 4D-CMG KNOWLEDGE LIBRARY.

The present method and apparatus provides for a process that generates a data store and data store loading process software. The explanation of a word-concept, phrase or sentence or story is used to generate a structured database table or unstructured text. The column properties of the database table are calculated based on the computer morphology entailed by the lexical units stored in the 4D-CMG KNOWLEDGE LIBRARY apparatus. The normalization of the tables or tables expressing the semantic frame is calculated from the phrase structure grammar properties of the semantic frame generating separate tables and linking keys for repeating groups of modifying phrase structure, e.g., prepositional phrases.

The generated table or tables are used to calculate data source and data target information that is used to generate ETL (extract, transform and load) process software to complete the loading of data from its source into the new target table or tables. The calculated database generation and loading specification is stored in the 4D-CMG KNOWLEDGE LIBRARY. They can be executed at any time to generate the specified database and load it.

The present method and apparatus provides for transforming the 4D-CMG Frames into stories. 4D-CMG Frames and stories are knowledge objects unique to the 4D-CMG. The transformation process uses machine learning classifiers to identify patterns of 4D-CMG Frames. Identified patterns of 4D-CMG Frames become the events of a story or stories in the source data. These 4D-CMG Frames are then connected with space-time information, cause-effect information and conditionals to produce the flow of the story from beginning to end. Finally, agents and instruments are excerpted from the semantic frames to populate the story. Endophoric reference including anaphora and metonymy are resolved and the completed story is stored in the 4D-CMG KNOWLEDGE LIBRARY results.

The method described herein is used to create a calculated data store generation specification which is stored in the 4D-CMG KNOWLEDGE LIBRARY.

The present method and apparatus provides for integrating stories across data sources. The stories are knowledge objects unique to the 4D-CMG grammar apparatus. Stories from different data sources may have the same meaning, but store it in different data structures that reflect different conceptualizations of the data. To integrate these stories across diverse data sources requires that the method described herein transforms the same meaning into the same data structure. The objective of the method is thus to transform data structures with a common meaning into a single data structure. The method accomplishes this by first identifying lexical units in stories that share a common conceptual hierarchy. When all the lexical units in a semantic frame within a story are each members of the same conceptual hierarchy within +/− one conceptual level, then the semantic frames can be transformed and the transform proceeds. Due to the distributed nature of data in data structures, a single data structural transform will entail many other structural transforms. These additional structures are recruited into the transform and the transform proceeds until it has exhausted related data structures.

Successive transforms are applied to all source data structures until they are exhausted. The result is a mapping of data sources to a single target data structure such that the same meaning from n-data sources is stored in a single target structure. These source to target mappings are used by the method described in claim 4 to calculate a generative database specification with is stored in the 4D-CMG KNOWLEDGE LIBRARY.

The present method and apparatus provides for fusing integrated stories and their events and entities. The integrated stories are stored in the 4D-CMG KNOWLEDGE LIBRARY. Fusing these integrated stories means establishing which stories or events or entities are identical. When identity is established then stories, events or entities can be fused into a single data structure.

The process of establishing identity for stories, events or entities uses data fusion lists which are n-tuples of properties or characteristics associated with the ontological representation of the existent in the 4DCMG. Each tuple of the n-tuple list is a property or characteristic measurement of the manifestation of a story, event or entity. The tuples are divided between those that will establish identity with=>accuracy and those that give a confidence level of 75%, The fusion list measurement of identity thus produces two fusions of the source data stories, events or entities: those with >=99% and those with confidence of >=75% but <99%. The fusion list values are compared and matched. The source integrated stories are thus partitioned into data sets with matching values. The partitioning fuses the stories, events and entities. Note that the fusion is three dimensional in that the same entity (same partitioned data set) may participate in many different events which are orthogonal to entities and in turn orthogonal to story partitions. Fusion lists are created by enumeration of the property or characteristic sets modifying each existent in the ontology. Thus as the 4D-CMG ontology learns from experience, so the fusion list sets increase in size.

Finally, fused data sets can be stored in fused data stores. The generative specifications are calculated and stored in the 4D-CMG KNOWLEDGE LIBRARY The 4D-CMG KNOWLEDGE LIBRARY is an apparatus for representing cognitive knowledge about natural language meaning and for storing the calculations made about that meaning. It is used by all methods in the enterpriseMind process. The 4D-CMG KNOWLEDGE LIBRARY has two parts: the 4D-CMG cognitive grammar used to understand meaning and 4D-CMG KNOWLEDGE LIBRARY results which contains the results of the calculations made about that meaning.

The 4D-CMG cognitive grammar is organized into five meaning levels:

Manifestations of percepts in space-time—things that exist physically or as mental constructs which have a location in space-time and a source data location.

Conceptual Ontology—integration of perceptual manifestations, genus and specie linkages, definition and entailed linkages pointing at perceptual manifestations. Concepts have a computer morphology (including MDM) which governs the realization of the concept in a computer system and population control tables of valid or prototype data values.

Word-Concepts—the name of a concept carried as a lexeme (with lemma) or phrase which because of word sense disambiguation may point to multiple concepts Sentential and Sentences—a framework of slots that describe a sentence or phrase wherein the slots have selectional restrictions which specify what lexical units may fill a slot. Selectional restrictions maybe perceptual, conceptual, grammatical functions, syntactic agreement or lexical rules. The verb slot 4D-CMG Frames can be replaced by an algorithmic or mathematical expression and the other frame slots by arguments and conditionals or by values calculated and passed during execution. The verb has argument properties for its SVO or SV slots.

Stories—an ordered set of 4D-CMG Frames or stories with entry and exit conditions, where the order, iteration and recursion execution can be explicitly controlled. Stories have Turing machine compute power and are formally a superset of Colored Petri Nets. The 4D-CMG apparatus uses a 3 dimensional model of meaning containing characteristics/properties that create a 3-D open ball around lexical units in source data. Stories contain procedural knowledge. enterpriseMind is self-referential so that it can change steps in procedures or whole procedures during execution. The stack of dimensions are:

Lexical unit's manifestations, typically named things where the classifying feature set is exemplar perceptual strings Lexical unit's lemma focal conceptual characteristics/properties. The classifying feature set is represented as fusion lists which are list lists of a lexical units properties/characteristics Lexical unit's word sense as a frame element in a semantic frame where the classifying feature set is represented as semantic frame slot/filler lists with property/characteristics for each slot in the frame. Each of these slots have different kinds of features including grammatical function, phrase grammar element, conceptual pragmatics rules, frame element concept and syntactic properties.

4D-CMG understanding uses a method called "ensemble understanding" of source data. It uses the meaning stack in a corresponding stack of a method of ensemble learning and classification. Each learning algorithm in the ensemble stack constructs hyperplanes for a single level of the meaning stack, for example using a support list machine. Beginning with level (i), the ensemble classifies the source data meaning. Each succeeding meaning level in the stack uses the preceding level's classification result to shrink the open ball around the lexical meaning. Level (iii) produces the highest confidence classification.

Thus, the ensemble classifier is equivalent to a single classification hypothesis over the lexical units. Note that each level in the ensemble uses a different feature set of properties/characteristics to classify the lexical unit and it is this diversity that results in the robustness and accuracy of classification.

The 4D-CMG uses a method called "corroborative meaning". After source data is understood by the "ensemble understanding" method it can be aggregated to build a larger picture of stories, events and entities. Transforms from the 4D-CMG are used to aggregate meaning into integrated data sets. These integrated data sets are then fused using fusion lists. The fusion lists establish identify of stories, events and entities. The fused data is ordered in time and by location so that the fused target data elements corroborate each other. This provides the most complete story about events or entities that the source data supports.

Figure 15:
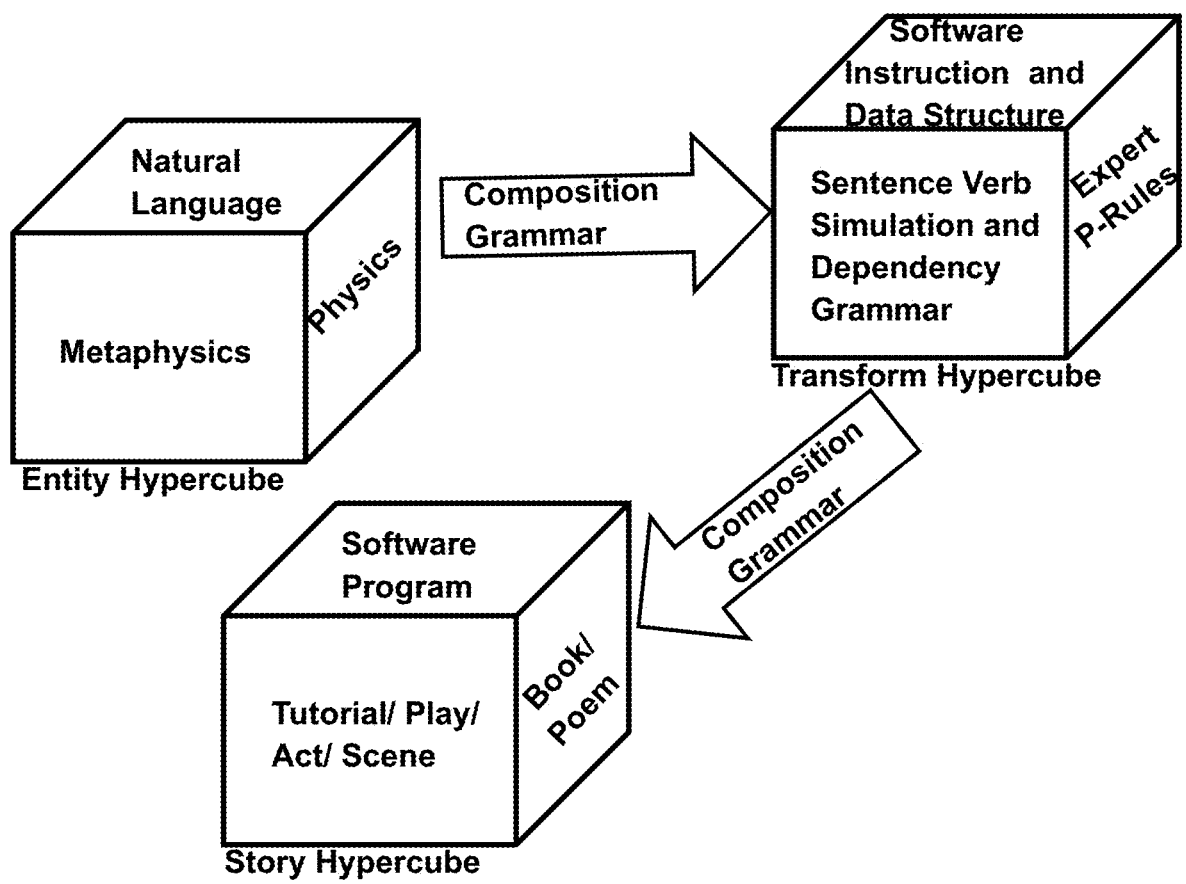
FIG. 15 illustrates three 3D-MHC (3-Dimensional Meaning Hypercubes) and the compositional production rule grammar connecting them.

FIG. 15 illustrates enterpriseMind's 9-Dimensional Meaning Hypercube (9D-MHC). This hypercube contains meaning artifacts that are analogs of knowledge in the human brain. The 9D-MHC is a computer simulation of human knowledge and simulates human cognitive structures. The 9D-MHC is realized on a computer as Artificial Neural Nets (ANN) plus digital processes.

Each 3D hypercube simulates human knowledge about some kind of human perception: Entity MHC about existents, Transform MHC about changes in entities and Story MHC about step-by-step processes.

Each dimension of an MHC captures meaning and associated processing about that kind of knowledge. For example, Metaphysics in the Entity MHC captures epistemological concept formation processes that enable generalization/specialization processing. Sentence Verb Simulation and Dependency Grammar in the Transform MHC is knowledge about transitive verb changes to entities and phrase dependencies that modify the meaning of nouns by adjectives or quantifiers. It enables sentence understanding/composition explicating how lexemes modify concept meaning, verb arguments within a sentence are governed and how verbs entail other verbs, e.g., buy and sell.

Each 3D-MHC is composed into more complex knowledge with a production rule grammar as described above, referred to above as 4D-CMG. The Entity MHC is composed into the Transform MHC which in turn is composed into the Story MHC.

A simple example is that lexemes in the Entity MHC are composed into sentences in the Transform MHC which are composed into stories in the Story MHC. For example, Ali's-Truck in the Entity MHC can be composed using 4D CMG production rules into a sentence in the Transform MHC such as Ali's-Truck collided with Don's car. This sentence in the Transform MHC together with other sentences can then be composed into a Story MHC describing an auto accident, e.g., attributes of an insurance claim like "claim status" and "claim loss date" are composed into an "insurance claim data structure".

The purpose of the 9D-MHC is to record human knowledge meaning in a simulation that mirrors human understanding processes. This meaning strategy renders the knowledge directly usable by humans. Other strategies such as the Google ANN that plays the game GO more expertly than most humans use what we call mathematical strategies. These math strategies result in GO moves that are effective while being non-intuitive and non-intelligible by human players. The knowledge created by such math processes varies so much from human knowledge as to be unintelligible. The present method and system generates Human Intelligible knowledge, which is a key feature and key advantage of the 9D-MHC. The three dimensions of each 3D-MHC create a Meaning Vector tuple that is usable to locate and manipulate meaning.

Illustrated in FIG. 15, the Entity Hypercube of the 9D-MHC has three dimensions: Metaphysics, Physics and Natural Language. These three kinds of knowledge are three different properties of Entities. They intersect because they are three kinds of knowledge about the same thing, namely Entities. Essentially, they are three different kinds of knowledge process about a single existent. The Metaphysics dimension simulates human ontology, i.e., concepts and concept relationships. The concept relationships are organized into a Metaphysics Concept Hierarchy as genus/species tuples, i.e., more general genus concepts and species which are more specific concepts.

Illustrated in FIG. 16, the Metaphysics Concept Hierarchy relationships link increasing specific concepts from Artifact to Truck, to Ford Truck to Ali's-Truck. This concept hierarchy supports a simulation of human generalization.

Notice that the species concept of Ali's-Truck is ==NER or Named Entity Recognition. An NER is the thing itself. It is the bottom of the generalization stack and is a specific entity at a specific space-time location (STL). Ali's Truck exists as a thing and not just as a named concept. In the Entity hypercube this means that it is a manifestation which has a world line existence at a particular STL. Ali's-Truck exists on its world line as an infinite set of space time locations each older than the proceeding STL. This accounts for knowledge about entities aging. In one embodiment, each NER manifestation has a unique ANN that learns to classify the NER at an STL.

Illustrated in FIG. 16, Physics Concept Properties are the physical property concepts that describe the meaning properties for their Owning Concept. In this example: Ali's-Truck. Each owning concept can have an unlimited number of properties. Each property may belong to a different concept hierarchy and will therefore have a potentially different generalization. Each owned concept in this example is an NER, that is it is a specific thing that exists in reality at a specific STL. Thereby, the concept frame's ontological learning algorithm is thus able to calculate the ontological knowledge hierarchy dynamically on the basis of properties and set membership: a subset concept, the species of an owning superset concept, has all the properties of its owning superset.

This is a simulation of how the human brain records knowledge: it is always specific. This is what allows the ANN to classify the entity. The ensemble of properties increase enterpriseMind's ability to unambiguously identify entities, in effect, multiple ANNs triangulate the meaning.

Illustrated in FIG. 17 are Natural Language properties of concepts. In this case synonyms for the same genus/specie tuple: vehicle/truck. Notice that this same structure also handles homonyms: changes to the genus/species tuple allow the same lexeme to point to different meanings with different properties and therefore different ANNs. This is also the structure that manages lexical morphology.

Illustrated in FIG. 15, the Transform Hypercube of the 9D-MHC has three dimensions: Sentence Verb Simulation/Dependency Grammar, Software Instruction/Data Structure and Expert P (Production) Rules. In the same way that the Entity MHC was knowledge about a single existent: Entities, so the Transform MHC is knowledge about a single existent: Strings. These strings consist of entities described in the Entity MHC, e.g., words composed into sentences. Each dimension of the Transform MHC specifies a different kind of transformation using a different kind of string syntax.

Figure 18:
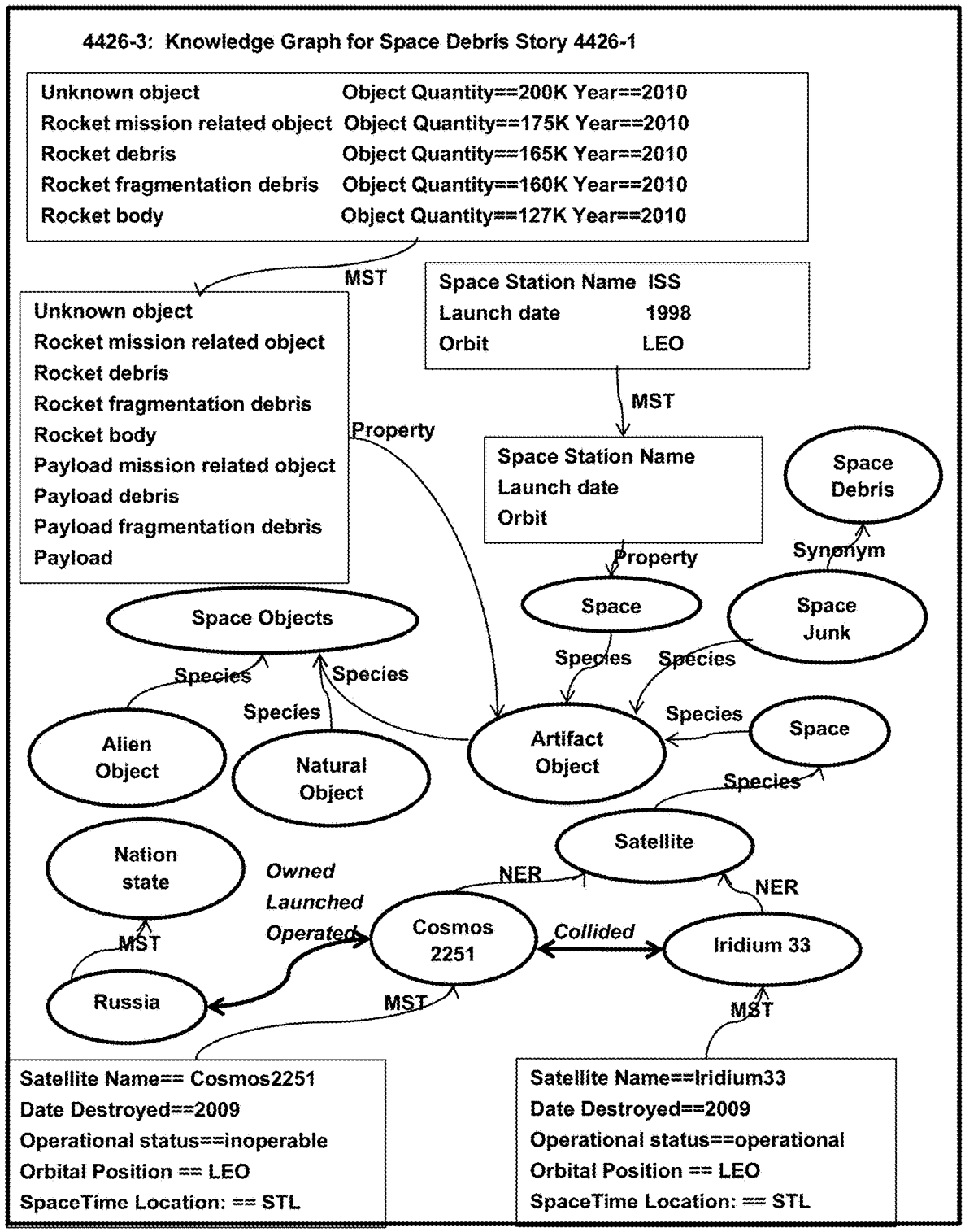
FIG. 18 illustrates Cognitive Knowledge Graph for Space Debris Story.

In one exemplary embodiment, FIG. 18 illustrates a cognitive graph of Sentence Verb Simulation/Dependency Grammar for the verb "collided". It models the collision between two satellites: Cosmos 2251 and Iridium 33. The complete sentence string is: "In 2009 a U.S. Iridium communications satellite collided with the broken Russian spacecraft Cosmos 2251", as illustrated in FIG. 19 Block 1 in its story context.

The graph is composed of Entity MHC elements plus other Transform MHC strings. Compositional production rules consume Entity MHC elements producing the unique string syntax. The compositional production rules obey a dependency grammar as illustrated in FIG. 19 block 2. The dependency grammar is stated as pairs of tuples that specify how lexemes change the meaning of subsequent words. For example, compound dependencies specify satellite modified by communications and in turn specified by Iridium making the lexical string "Iridium communications satellite". This knowledge specification describes how the concept meaning of three Entity MHC elements are composed into a sub-unit Transform MHC string. The satellite concept is modified by a type=communications and turned into a NER (named entity) with the Iridium name.

Finally, illustrated in FIG. 19 block 3, is the verb simulation of "collided". Verb simulations are Entity MHC with the usual properties, in this case, "collide==crash together"

but also the Transform MHC properties of specifying verb arguments. In this "collided" verb simulation the input verb arguments for "crash together" are the two satellites" Cosmos 2251 and Iridium. The output verb argument is "space debris", the process control verb argument is collision date=="2-10-2009 @ 1656 GMT" and the support verb argument is Collision Location==LEO (low earth orbit) @ 480 miles of altitude. The Verb simulation plus the dependency grammar provides a specification of linguistic string meaning in the Transform MHC. The compositional grammar that generates sentences or understands sentence meaning works with the Entity MHC to, in effect, create selectional restrictions that block nonsense meanings. In a similar fashion, verb simulations block nonsense compositions like the "book flew the airplane" because the verb argument support subject concept must have an agentive property.

As illustrated in FIG. 15, Transform MHC, the second dimension of the Transform MHC is Software Instruction and Data Structure: another kind of a string object. There are three differences between Transform MHC string objects: (i) the Entity MHCs in different kinds of strings are different which is just the difference between lexemes, software language reserved words or production rule assertions. (ii) the string syntax is different, i.e., lexical strings will obey natural language syntax, programming instruction strings will obey their language syntax, e.g., Python code or P (production) Rules obey assertion syntax. And finally (iii) some of the strings are executable as software instructions, e.g., both program/data structures and production rules are executable. Natural Language lexical strings are not. As illustrated in FIG. 19, block 4 a Software Instruction, follows the programming language syntax. The reserved words and variable names are specified in the Entity MHC. However, for development speed these individual software instructions can be treated as blocks of code performing a single function as here. This block of code is named JPEG Image Display in the Entity MHC and is a Python code block that will execute to display a JPEG image file. Notice that the Sentence Strings in the Transform MHC can be converted into Software Instructions with compositional productions rules operating between the dimensions of the Transform MHC giving the effect of pseudo code descriptions of Software Instructions.

As illustrated in FIG. 15, Transform MHC, the third dimension of the Transform MHC is a P (Production) Rule. A production rule model is illustrated in FIG. 20 4426-5. The production rule itself is realized on this diagram in process 4.7.2.1. The left-hand side of the rule which is IF (expression) where expression is any math, logical or statement for which the Truth values can be evaluated. If (Expression) ==True THEN condition P is executed ELSE condition Q is executed. Production rules as in this example can be used to control program execution. They can also be used to specify grammars like phrase structure grammars, e.g., S→NPVP or the Compositional Grammars between dimensions of the 9D-MHC that compose Entity MHC into Transform MHC and these into Story MHC as illustrated in FIG. 15.

It is in this sense that the 9D MHC is self-referential, i.e., it is used to describe itself. The 9D-MHC cognitive structures hold knowledge about itself and compositional grammars operating on it are used to change what it knows about itself and its knowledge about the world. This self-referential feature enables the 9D-MHC to act in a self-defining goal directed manner that models human free will. It is essential for human level language and other human level behaviors.

As illustrated in FIG. 15, the third hypercube in the 9D-MHC is the Story MHC. The purpose of the Story MHC is to account for knowledge that is composed of the dimensional elements in the Transform MHC, but for which the compositional principals and syntax are different.

For example, a sentence is composed from Entity MHC elements with a natural language composition grammar. That natural language grammar does not describe how sentences are composed into a book or for that matter how sentences are composed into a dialogue. The compositional grammar for a book is distinct from that for a dialogue and both are different from the compositional grammar for natural language sentences.

It is perhaps counter intuitive that Transform MHC elements like sentences can be composed into a book using a book grammar that is different from, but related to the compositional grammar for dialogue. The Story MHC has three dimensions: Software Program and Book/Poem and Tutorial/Play/Act/Scene. Knowledge about software programs is illustrated in FIG. 20, block 4 and FIG. 20, 4426-5. FIG. 20, 4426-4 shows sequential Python code instructions that execute to display a JPEG image.

FIG. 20, block 5 shows the flow of control and flow of data between software instruction blocks of code one of which is the JPEG Image Display instructions. Notice that data stores like the "enterpriseMind Knowledge Library" are specified and are Entity MHCs.

These diagrams and the knowledge they represent in the Story MHC are Turing Complete or computational universal meaning that any algorithmic processing can be specified.

Tutorial/Play/Act/Scene is a second dimension of the Story MHC illustrated in FIG. 15. Illustrated in FIG. 21 block 6 is the key knowledge structure for Tutorial/Play/Act/Scene dimension. The structure incorporates sentences from the Transform MHC+Verb Simulation process models+P (Production) Rules+Entity MHC elements that in this example are automated, i.e., software code blocks.

The Automated Tutorial Elements from the Entity MHC are illustrated in FIG. 21 block 7. This knowledge structure is about an event==Kessler History #17. The executable actions of the event are specified in the Story Sentence lines. One line causes one event to be executed on a computer system. Story Verb Simulation processes specify and control arguments for the code for Google Text To Speech which is illustrated in FIG. 20 block 4.

The Tutorial event==Kessler History #17 is a single event in the Kessler History Scene which in turn is part of the Kessler Syndrome topic which is part of the Space Debris Tutorial. This decomposition knowledge is specified in the Contain-Hierarchy illustrated in the tope of FIG. 21 block 6.

The Tutorial/Play/Act/Scene dimension of the Story MHC supports a decomposition hierarch on n-elements similar to a movie script in which an unlimited number of entities can take part each involved in its own story line and each with n-processes like imaging, audio, dialogue, occurring.

Where as noted above the action instructions generate a processing output used within the computing environment for further operations or for additional or ancillary system operations. Various embodiments noted above, including for example generating a narrative about an individual from disparate facts (FIG. 3) and rule grammar computations (FIG. 15) are illustrative in nature and not expressly limiting. The action instructions generate actionable results using the noted computational algorithms and processing techniques described above.

FIGS. 1 through 21 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, Applicant does not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

What is claimed is:

1. A computerized method for generating an action instruction based on cognitive learning, the computerized method comprising:
   electronically accessing at least one neural network having a data set stored therein;
   retrieving the data set via a networked connection for processing by at least one processing device;
   determining, via the at least one processing device, at least one meaning data map of the data set, wherein the meaning data map is a collection of data including four cognitive frames, the cognitive frames being data structures representing cognitive structures of the data therein, the four cognitive frames including at least three meaning frames and at least one fact frame, wherein the cognitive frames are stored using a nine dimensional hypercube that comprises a plurality of three dimensional hypercubes, each of the three dimensional hypercubes representing a different level of knowledge data simulating human knowledge including: an entity multidimensional hypercube, a transform multidimensional hypercube, and a story multidimensional hypercube, and wherein the transform multidimensional hypercube is composed by applying production rule grammar to the entity multidimensional hypercube, and wherein the story multidimensional hypercube is composed by applying production rule grammar to the transform multidimensional hypercube;
   for each of the cognitive frames, associating a neural network with a corresponding training data set, wherein different cognitive frames are associated with different neural networks;
   training each neural network using the associated training data set;
   executing the neural networks of the at least one meaning data map to calculate a data meaning wherein the at least one meaning data map includes measurements of constituent concept properties associated with words; and
   generating the action instruction based on the data meaning of the data set.

2. The method of claim 1, wherein the at least three meaning frames includes: a story frame, a sentence frame, and a concept frame.

3. The method of claim 1, wherein the nine dimensional hypercube is self-referential using the associated neural networks.

4. The method of claim 1, wherein the data set includes structured and unstructured data, the method further comprising:
   executing inductive learning operations on the unstructured data of the data set.

5. The method of claim 1, wherein in determining at least one meaning data map, the method further comprises:
   generating a structured database table from the data set;
   calculating column properties for the structured database table based at on least one of the plurality of cognitive frames;
   normalizing the structured database table for expressing a semantic frame based on phrase structure grammar properties; and
   calculating data source and data target information therefrom.

6. The method of claim 5 further comprising:
   executing extract, transform, and load operations to generate the structured database table from the data set.

7. The method of claim 1, wherein the step of determining at least one meaning data map includes translating the plurality of cognitive frames into a story and calculating the data meaning based on the story.

8. A system for generating an action instruction based on cognitive learning, the system comprising:
   a data store having four-dimensional cognitive meaning grammar and a knowledge library stored therein; and
   at least one processor programmed with executable instructions which, when executed, cause the processor to perform a method comprising:
   access the data store to retrieve the data set;
   determine at least one meaning data map of the data set, wherein the at least one meaning data map is a collection of data including four cognitive frames, the cognitive frames being data structures representing cognitive structures of the data therein, the four cognitive frames including at least three meaning frames and at least one fact frame, wherein the cognitive frames are stored using a nine dimensional hypercube that comprises a plurality of three dimensional hypercubes, each of the three dimensional hypercubes representing a different level of knowledge data simulating human knowledge including: an entity multidimensional hypercube, a transform multidimensional hypercube and a story multidimensional hypercube, and wherein the transform multidimensional hypercube is composed by applying production rule grammar to the entity multidimensional hypercube, and wherein the story multidimensional hypercube is composed by applying production rule grammar to the transform multidimensional hypercube;

for each of the cognitive frames, associate a neural network with a corresponding training data set, wherein different cognitive frames are associated with different neural networks;

train each neural network using the associated training data set execute the neural networks of the at least one meaning data map to calculate a data meaning, wherein the at least one meaning data map includes measurements of constituent concept properties associated with words; and generating the action instruction based on the data meaning of the data set.

9. The system of claim 8, wherein the four-dimensional cognitive grammar is organized into a plurality of meaning levels, the plurality of meaning levels including at least one of: space-time precepts level, a conceptual ontology, a word-concept level, a sentential and sentences level; and a stories level.

10. The system of claim 8, wherein the nine dimensional hypercube is self-referential using the associated neural networks.

* * * * *